US008547419B2

(12) United States Patent
Wang

(10) Patent No.: US 8,547,419 B2
(45) Date of Patent: Oct. 1, 2013

(54) METHOD FOR DETERMINING A THREE-DIMENSIONAL REPRESENTATION OF AN OBJECT USING POINTS, AND CORRESPONDING COMPUTER PROGRAM AND IMAGING SYSTEM

(75) Inventor: Jiaping Wang, Antony (FR)

(73) Assignee: Universite Paris 13, Villetaneuse (FR)

( * ) Notice: Subject to any disclaimer, the term of this patent is extended or adjusted under 35 U.S.C. 154(b) by 531 days.

(21) Appl. No.: 12/736,272

(22) PCT Filed: Mar. 25, 2009

(86) PCT No.: PCT/FR2009/050512
§ 371 (c)(1),
(2), (4) Date: Oct. 26, 2010

(87) PCT Pub. No.: WO2009/125131
PCT Pub. Date: Oct. 15, 2009

(65) Prior Publication Data
US 2011/0037831 A1 Feb. 17, 2011

(30) Foreign Application Priority Data

Mar. 27, 2008 (FR) ...................................... 08 51985

(51) Int. Cl.
*H04N 13/02* (2006.01)
(52) U.S. Cl.
USPC .......................................................... 348/46
(58) Field of Classification Search
None
See application file for complete search history.

(56) References Cited

U.S. PATENT DOCUMENTS

| | | | | |
|---|---|---|---|---|
| 5,652,831 A * | 7/1997 | Huang et al. | ................... | 345/604 |
| 5,892,691 A * | 4/1999 | Fowler | ............................... | 703/6 |
| 6,253,164 B1 * | 6/2001 | Rohm et al. | ....................... | 703/2 |
| 6,377,865 B1 * | 4/2002 | Edelsbrunner et al. | .......... | 700/98 |
| 6,996,505 B1 * | 2/2006 | Edelsbrunner et al. | ........... | 703/2 |
| 8,004,517 B1 * | 8/2011 | Edelsbrunner et al. | ........ | 345/419 |
| 2002/0041717 A1 * | 4/2002 | Murata et al. | .................. | 382/275 |
| 2003/0068079 A1 * | 4/2003 | Park | ............................... | 382/154 |
| 2004/0021876 A1 * | 2/2004 | De Jonge et al. | .............. | 356/601 |
| 2004/0108999 A1 * | 6/2004 | Martin | ........................... | 345/423 |

(Continued)

FOREIGN PATENT DOCUMENTS

EP 1 413 911 4/2004

OTHER PUBLICATIONS

Bindiganavle, Parametric B-splines, pp. 1-24.*

(Continued)

*Primary Examiner* — Sath V Perungavoor
*Assistant Examiner* — Peter D Le
(74) *Attorney, Agent, or Firm* — Jacobson Holman PLLC

(57) ABSTRACT

The method of the invention includes: determining a set of points of a space and a value of each of these points at a given moment, the set of points including the points of the object in the position thereof at the given moment; selecting a three-dimensional representation function that can be parameterized with parameters and an operation that gives, using the three-dimensional representation function, a function for estimating the value of each point in the space; and determining parameters, such that, for each point in the set, the estimation of the value of the point substantially gives the value of the point.

12 Claims, 9 Drawing Sheets

(56) References Cited

U.S. PATENT DOCUMENTS

Figure 4:
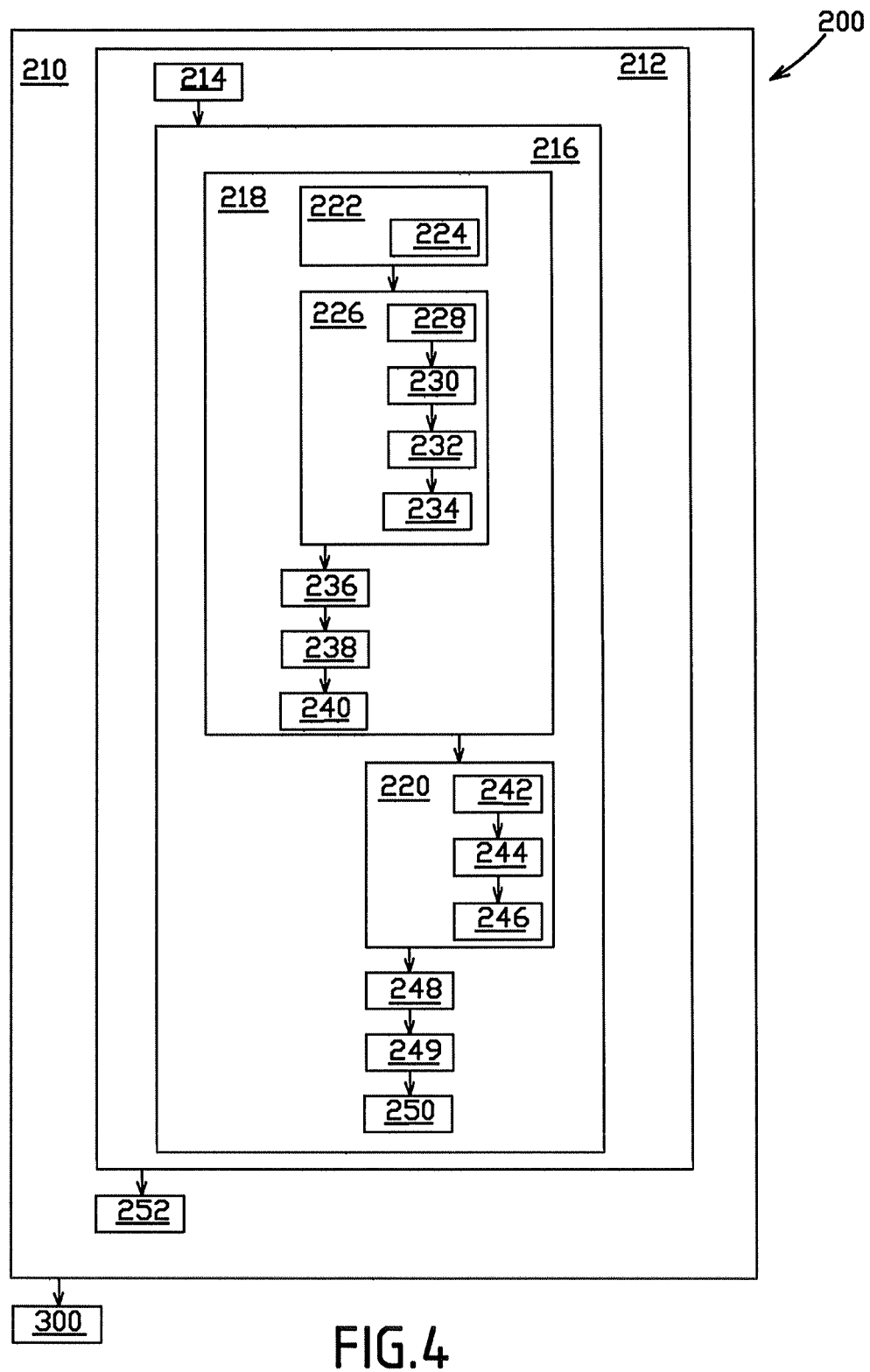

| | | | |
|---|---|---|---|
| 2004/0228529 A1* | 11/2004 | Jerebko et al. | 382/173 |
| 2004/0249303 A1* | 12/2004 | Serra | 600/545 |
| 2005/0168460 A1* | 8/2005 | Razdan et al. | 345/419 |
| 2005/0246130 A1* | 11/2005 | Spicer et al. | 702/152 |
| 2005/0259882 A1* | 11/2005 | Dewaele | 382/243 |
| 2006/0109277 A1* | 5/2006 | Fenney et al. | 345/584 |
| 2006/0235666 A1* | 10/2006 | Assa et al. | 703/10 |
| 2009/0080747 A1* | 3/2009 | Lu et al. | 382/131 |

OTHER PUBLICATIONS

The University of Texas at Austin, BB-splines, A-Splines and B-Splines, Fall 2005, Department of Computer Sciences, pp. 39.*

Thevenaz et al., Interpolation Reviisited, Jul. 2000, IEEE Transactions, vol. 19, No. 7, pp. 20.*

Yong et al. "A bayesian 3D volume reconstruction for confocal micro-rotation cell imaging." Medical Image Computing and Computer-Assisted Intervention A Miccai, vol. 4792, Oct. 29, 2007, pp. 685-692.

* cited by examiner

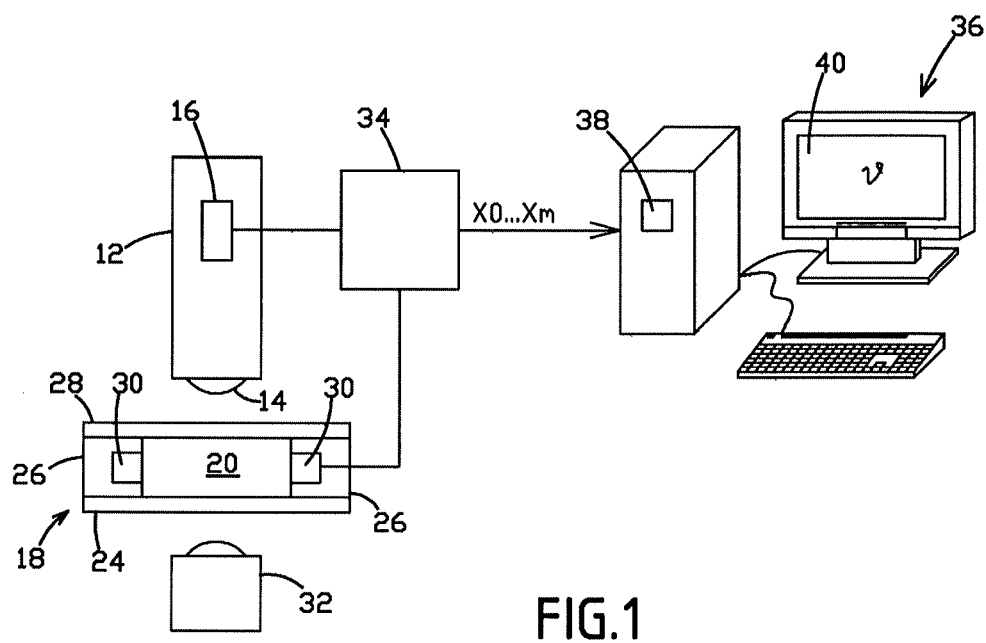
FIG.1
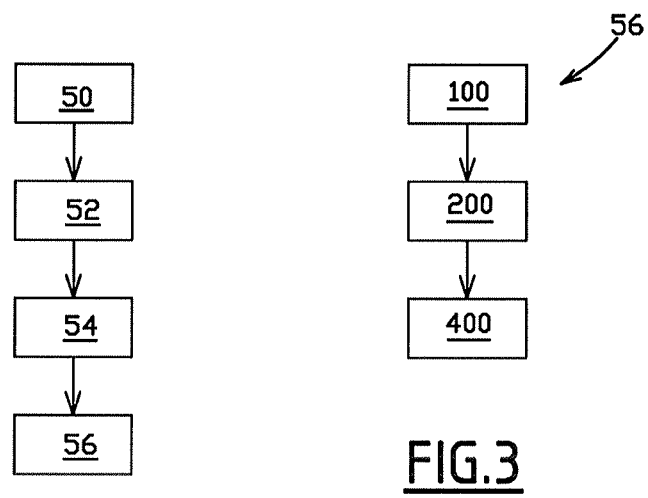
FIG.2
FIG.3

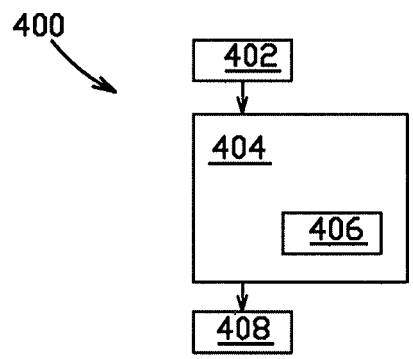
FIG.10
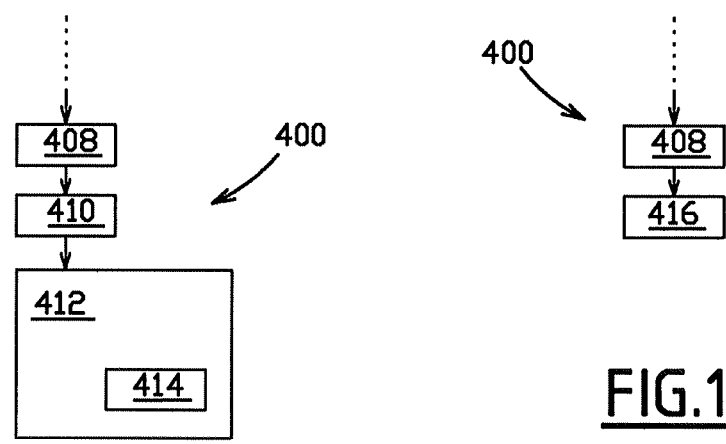
FIG.11
FIG.12

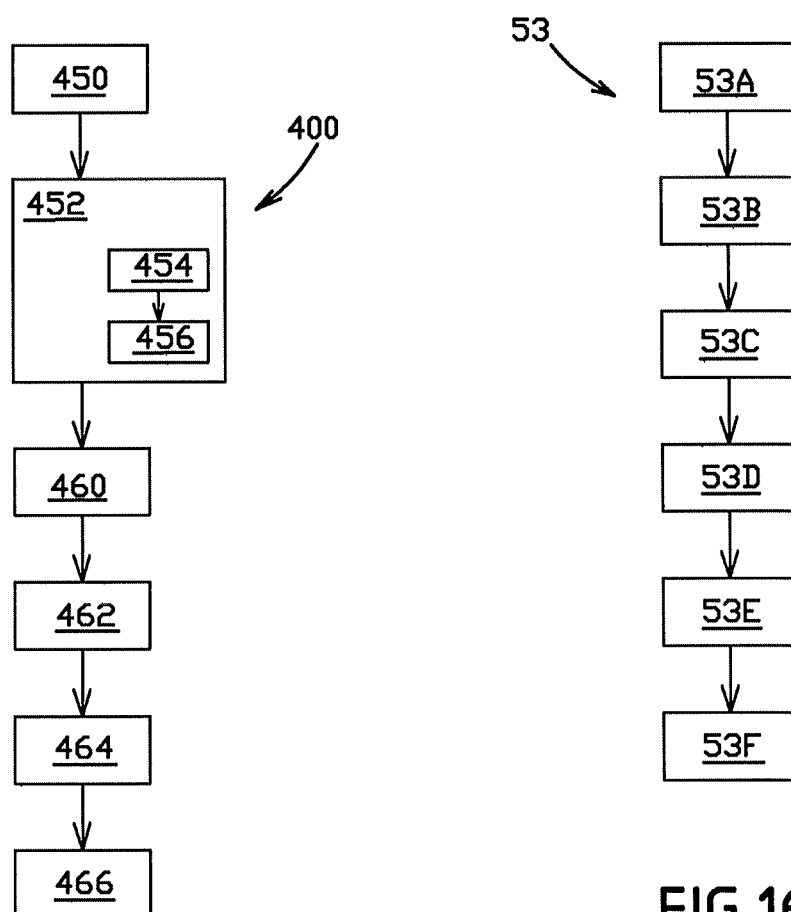

METHOD FOR DETERMINING A THREE-DIMENSIONAL REPRESENTATION OF AN OBJECT USING POINTS, AND CORRESPONDING COMPUTER PROGRAM AND IMAGING SYSTEM

This is a 371 of PCT/FR09/050512 filed Mar. 25, 2009, which has a priority of French no. 08 51985 filed Mar. 27, 2008, hereby incorporated by reference.

The present invention relates to a method for determining a three-dimensional representation of an object.

The invention applies in particular for the reconstruction of micro objects in microscopic-imaging systems.

The prior art document EP 1 413 911 A1 describes a method for determining a three-dimensional representation of an object on the basis of a sequence of sectional images of the object in a section plane, each sectional image having been captured at a respective instant of picture capture while the object moved with respect to the section plane.

In this prior art document, the object is a cell of dimension of the order of a few micrometers. The cell is marked with a fluorescent compound and is placed in a receptacle of a microscopic-imaging system. A confinement field is created in the receptacle so as to control the position of the cell, without the latter being squashed. The microscopic-imaging system furthermore comprises an optical microscope having a focal plane forming the section plane. In order to obtain the sequence of sectional images, the cell is rotated at a constant angular rate around an axis of the focal plane, and sectional images are captured at a rate of between 1 and 1000 acquisitions per second.

The prior art document furthermore proposes to determine the three-dimensional representation of the cell on the basis of the usual reconstruction techniques used in tomography. These usual techniques consist in determining the three-dimensional representation of an object on the basis of sectional images and of the positions of the object with respect to the section plane, the positions of the object with respect to the section plane being determined by the knowledge of the adjustment settings of the radiography machine and/or of physical sensors making it possible to ascertain the position of the radiography machine.

The aim of the invention is to provide a reconstruction method allowing the fast determination of a three-dimensional representation while having good resolution.

Thus, the subject of the invention is a method for determining a three-dimensional representation of an object, characterized in that it comprises:

- the determination of a set of points of a volume and of a value of each of these points at a given instant, the set of points comprising points of the object in its position at the given instant,
- the choosing of a three-dimensional representation function that can be parametrized with parameters, and of an operation giving, on the basis of the three-dimensional representation function, an estimation function for the value of each point of the set,
- the determination of parameters, such that, for each point of the set, the estimation of the value of the point gives substantially the value of the point.

According to other characteristics of the invention:

- the three-dimensional representation function comprises a decomposition into basis functions around nodes, so as to obtain a sum of terms, each term comprising the basis function with a variable dependent on a respective node associated with this term,
- the basis function comprises a product of B-spline functions in each of the three directions in space,
- the volume comprises a plurality of sub-volumes; the parameters being distributed in groups of parameters, the three-dimensional representation function is chosen so that each group of parameters is associated with a respective sub-volume; the determination of the parameters comprises, successively for each sub-volume, the determination of the parameters associated with this sub-volume, such that, for each point of the sub-volume, and preferably also of the sub-volumes directly contiguous with the sub-volume, the estimation of the value of the point gives substantially the value of the point, the parameters associated with the other sub-volumes being fixed at a given value,
- the value of each point of the set is obtained on the basis of a respective sectional image of the object, associated with the point; the operation gives a function for estimating the value of each point of the set, on the basis of the three-dimensional representation function and of a point spread function, the point spread function depending on a rotation between the position of the object at the instant of capture of the respective sectional image associated with the point, and the position of the object at the given instant; the three-dimensional representation function is chosen such that, for each point of volume:

$$Op(\phi, f_R)(u) = Op(\phi, f)(Ru),$$

with Op the operation, $\phi$ the basis function, R an arbitrary rotation, $f_R$ the point spread function for the rotation R, $f_R(u) = f(Ru)$, $f$ the point spread function without rotation, and Ru the point resulting from the rotation of the point u by the rotation R,

- the operation is a convolution of the three-dimensional representation function with the point spread function,
- the basis function is a radial basis function, each term depending on the distance of each point with the node associated with this term, but being independent of the direction between the point and the node,
- the determination of the set of points and of a value of each point is carried out on the basis of several sequences of sectional images, and the method comprises: the determination of a three-dimensional representation function, on a respective sub-volume, for each sequence, each three-dimensional representation giving a representation of the object in a respective position; the determination, for each sequence, of a rotation and of a translation making it possible to substantially place all the positions of the representations of the object in a reference position,
- the determination, for each sequence, of the rotation and of the translation comprises: the selection, in each subset, of at least three groups, preferably four or more, of points of the subset, according to a selection criterion, which is the same for all the sequences of sectional images; the determination of the rotation and of the translation of each sequence of sectional images on the basis of the groups of points,
- the determination of the rotation and of the translation of each sequence of sectional images on the basis of the groups of points comprises: the calculation, for each sequence of sectional images, of a barycenter of each of the groups of points; the determination of the rotation and of the translation of each sequence on the basis of the barycenters,
- the method comprises: the determination of an interval of acquisition of each sectional image; the determination of a continuous motion of the object during the interval of acquisition of each sectional image; the taking into account of the continuous motion of the object during the acquisition interval so as to determine the three-dimensional representation of the object, the motion of the object with respect to the section plane comprises a motion of rotation about a fixed axis and with a fixed angular rate and a series of perturbation translations, each undergone by the object between two successive respective sectional images; the continuous motion comprises the rotation about the fixed axis and with the fixed angular rate during the acquisition time for each sectional image, and a linear fraction of the perturbation translation undergone by the object between the sectional image and the next one.

The subject of the invention is also a computer program product which, when implemented on a computer, implements a method of the invention.

The subject of the invention is also an imaging system characterized in that it comprises: means making it possible to obtain images in a focal plane, a receptacle for receiving an object, means for setting the object into motion, means for receiving sectional images captured in the focal plane, which means are adapted for implementing a method according to the invention.

Figures 5, 7:
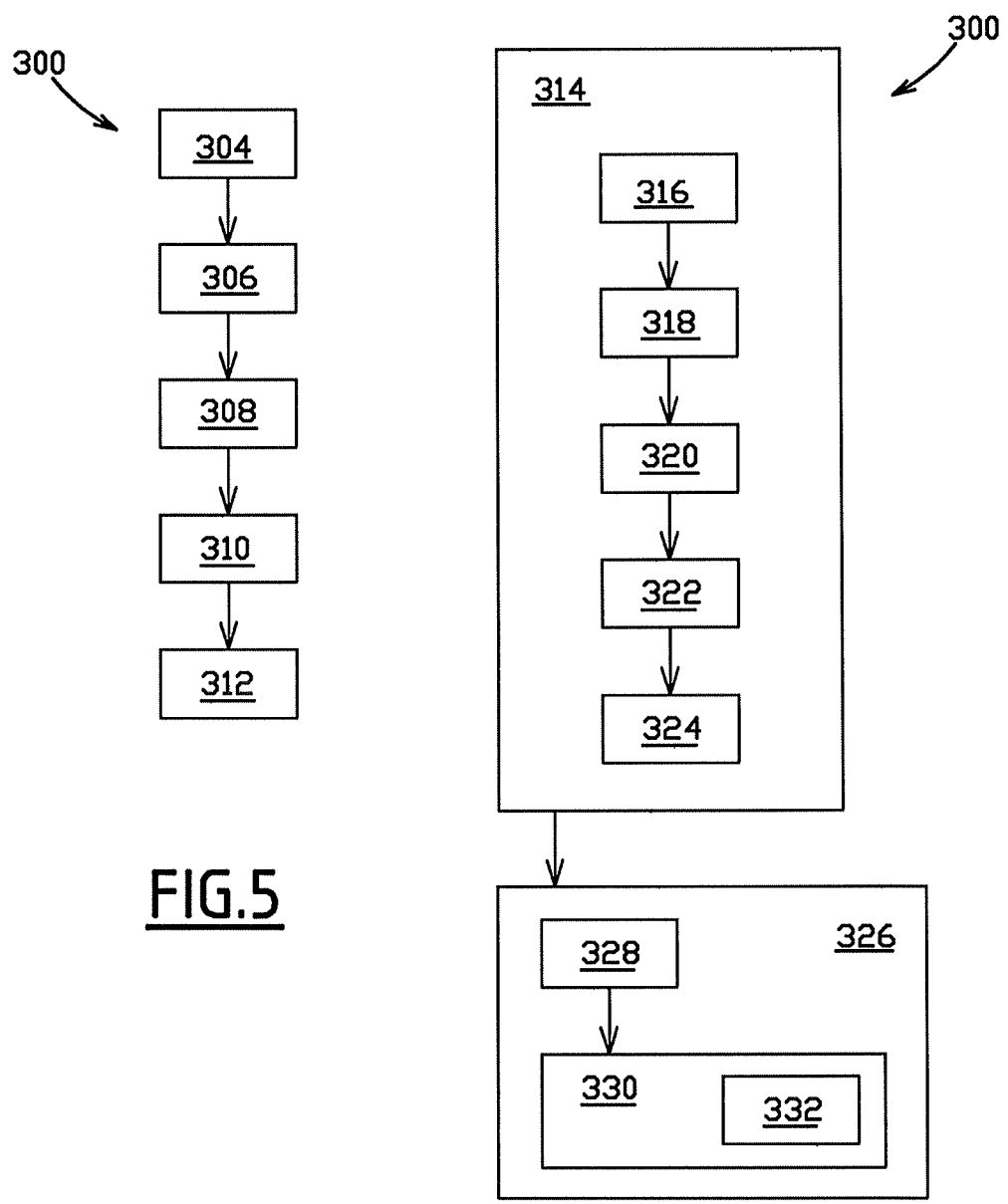
Figure 6:
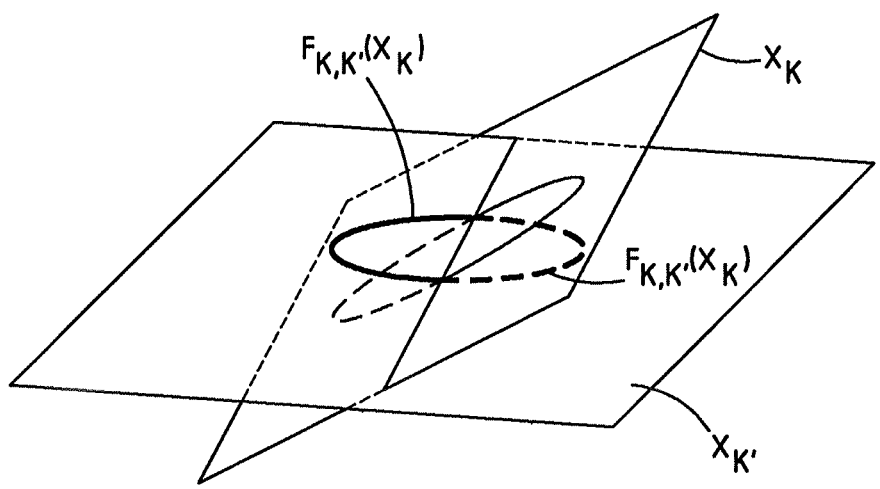
Figure 8:
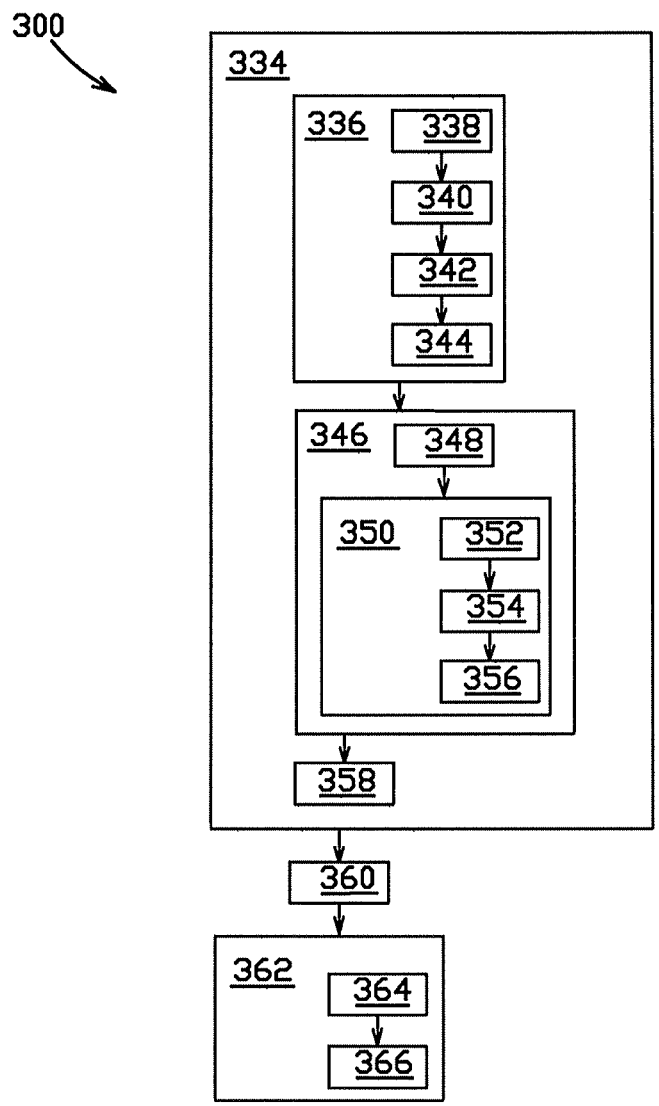
Figure 9:
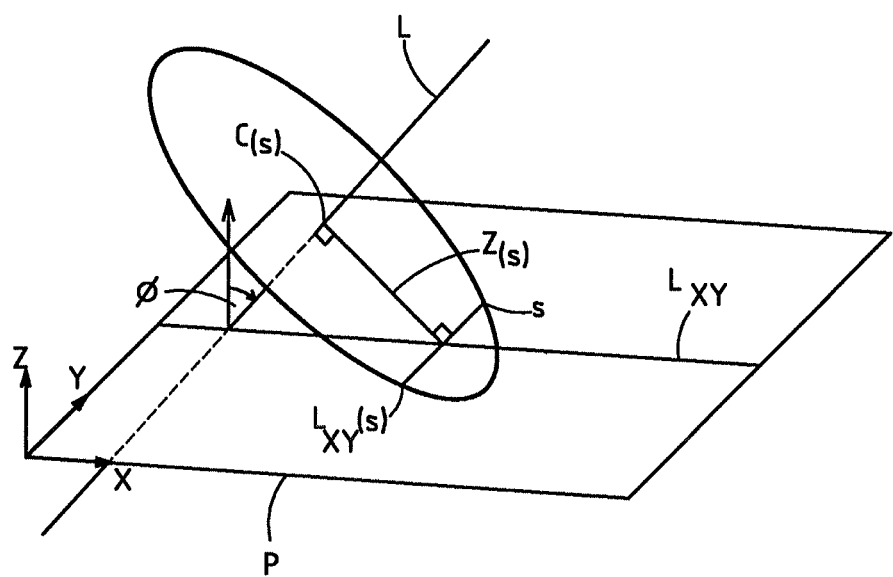
Figure 13:
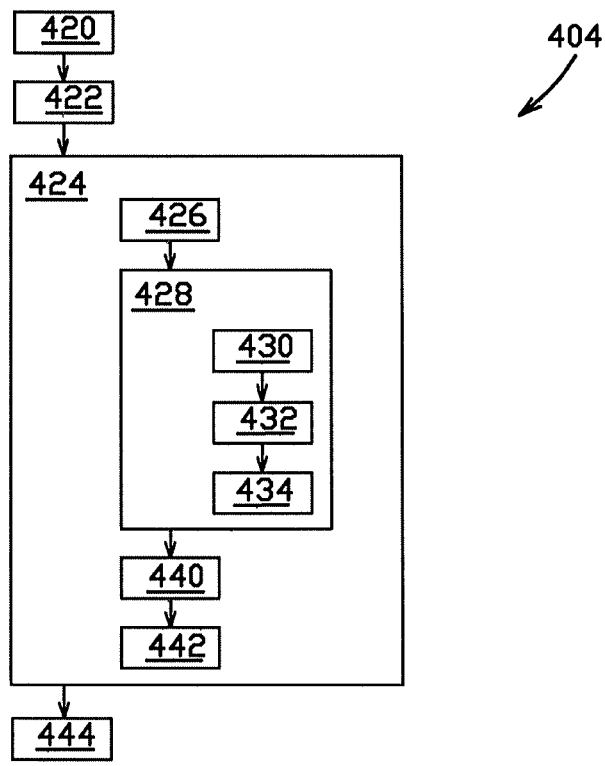
Figure 14:
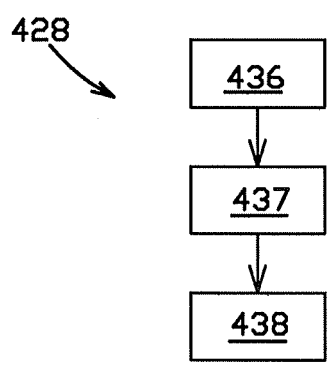

These characteristics, as well as others, will become apparent on reading the description which follows of preferred embodiments of the invention. This description is given with reference to the appended drawings, among which:

FIG. 1 represents an imaging system according to the invention,

FIG. 2 represents the steps of a method according to the invention for analyzing an object, FIG. 3 represents the steps of a method, implemented in the analysis method of FIG. 2, for processing sectional images of the object, FIG. 4 represents the steps of determining parameters of the motion of the object with respect to a section plane, FIG. 5 represents the steps of determining, according to a first variant, an axis of rotation of the object and a series of perturbation translations that the object undergoes, FIG. 6 illustrates the orthogonal projection of a sectional image on a support plane of a spatially neighboring image, FIG. 7 represents the steps of determining, according to a second variant, an axis of rotation of the object and a series of perturbation translations that the object undergoes, FIG. 8 represents the steps of determining, according to a third variant, an axis of rotation of the object and a series of perturbation translations that the object undergoes, FIG. 9 illustrates a circle cutting the section plane, which a point of the object describes about the axis of rotation, FIG. 10 represents the steps of the start of a determination of a three-dimensional representation of the object, FIG. 11 represents the steps of the end, according to a first variant, of the determination of a three-dimensional representation of the object, FIG. 12 represents the steps of the end, according to a second variant, of the determination of a three-dimensional representation of the object, FIG. 13 represents the steps of a variant for determining a set of points, for the determination of the three-dimensional representation of the object of FIG. 10, FIG. 14 represents the steps of a variant for selecting groups of points, carried out in the determination of the set of points of FIG. 13, FIG. 15 represents the steps, according to a third variant, of determining a three-dimensional representation of the object, and FIG. 16 represents the steps of an adjustment of the imaging system of FIG. 1.

The description which follows relates to the determination of a three-dimensional representation of a live cell. However, the person skilled in the art will have no hardship in transposing this description to other types of objects, live or inert.

Moreover, the mathematical relations indicated subsequently are expressed in a fixed XYZ frame, tied to the section plane P (which will be described further on) and whose XY plane coincides with this section plane P.

Furthermore, in the present description, the term "value" does not signify solely a number value, but can also be a vector value (that is to say a particular vector) or a line value (that is to say a particular line), etc., according to the nature of the mathematical object whose value is considered.

Description of the Imaging System

With reference to FIG. 1, a microscopic-imaging system 10 comprises first of all an optical microscope 12. The optical microscope 12 comprises a lens 14 defining a focal plane P. The optical microscope 12 furthermore comprises a camera 16, for example a CCD camera making it possible to obtain images in the focal plane P.

The microscopic-imaging system 10 furthermore comprises a receptacle 18 for receiving an object O of microscopic size, such as a cell, into which a fluorescent material has been introduced.

Generally, it is possible to replace the fluorescent material by any marker adapted to the object under study, and able to be detected by the imaging system used.

The receptacle 18 comprises a chamber 20 intended to contain a fluid microsystem comprising the object O. The chamber 20 is situated facing the lens 14 of the optical microscope 12. The chamber 20 is delimited by a support 24, lateral walls 26 and a glass pane 28 covering the walls 26 so that the lens can observe the content of the chamber 20. The chamber 20 defines a volume U.

The lateral walls comprise microelectrodes 30 for creating an electric field, the latter making it possible to position the object O.

The microscopic-imaging system 10 furthermore comprises a device 32 for illuminating the marker contained in the object O, so that each point o of the object O emits a luminosity O(o). Conversely, the environment of the object O emits a very low or even zero luminosity.

The microscopic-imaging system 10 also comprises a control unit 34, acting in particular on the microelectrodes 30 so as to set the object O into motion, and on the camera 16 so as to capture a sequence of sectional images $X_0 \ldots X_m$ in the focal plane P (which thus forms a section plane P of the volume U of the chamber 20, and in particular of the object O), at respective picture-capture instants $t_0 \ldots t_m$.

An XYZ reference frame is tied to the section plane P. Another reference frame, termed the reference frame of the object O, is furthermore tied to the object O. This other reference frame is chosen, preferably, such that it coincides with the XYZ reference frame at the initial instant $t_0$. Moreover, the term "a point of the object" subsequently signifies, unless explicitly indicated, a point in the reference frame of the object O.

Each sectional image $X_k$ extends over a support plane $P_k$ tied to the object O, this support plane $P_k$ coinciding with the section plane P at the moment $t_k$ of the capture of the sectional image $X_k$.

Each sectional image $X_k$ comprises a grid G of pixels s. The grid G is the same for all the sectional images $X_0 \ldots X_m$. Each pixel s records a value $X_k(s)$ of the luminosity of the marker at the position of the pixel s in the volume U of the chamber 20. In the present description, this luminosity value is recorded in a monochrome manner, in the form of a gray level.

Thus, when a point o of the object O is situated at the position of the pixel s, at the instant $t_k$ of capture of the sectional image $X_k$, the value $X_k(s)$ of this pixel s is dependent in particular on the luminosity O(o) of the point o. When no point of the object O is situated at the position of the pixel s, it is the luminosity of the "void" which is recorded (in fact, that of the fluid comprising the object O). Thus, the background of the sectional images $X_0 \ldots X_m$, has a low gray level.

Furthermore, the value $X_k(s)$ of a pixel s also depends on a point spread function (PSF) introducing a fuzziness. In general, the point spread function has a shape which is elongated perpendicularly to the section plane P.

The microscopic-imaging system 10 moreover comprises an image processing computing device 36, linked to the control unit 30 so as to receive the sectional images $X_0 \ldots X_m$. A reconstruction computer program 38 is installed on the computing device 36. The computer program 38 is designed to implement a reconstruction method intended to determine a three-dimensional representation V of the object O on the basis of the sequence of sectional images $X_0 \ldots X_m$. The computing device 36 is able to export the three-dimensional representation V in the form of a digital file and/or to display this three-dimensional representation V on a screen 40.

Description of the Analysis Method

A method of analyzing an object O, implemented by the imaging system 10, is illustrated in FIG. 2. With reference to this FIG. 2, the method for analyzing an object O comprises a step 50 of introducing the object O into the chamber 20, and then a step 52 of configuring the control unit 34 so as to rotate the object O about a fixed axis of rotation L, at a fixed angular rate $\tau$. The axis L is defined by a point $u_0$ on the axis of rotation L—subsequently called the point of passage $u_0$—and a direction $\vec{a}$ of the axis of rotation L, with unit norm: $\|\vec{a}\|=1$. The axis of rotation L is not perpendicular to the section plane P.

The analysis method furthermore comprises a step 54 of acquiring at least one sequence of sectional images $X_0 \ldots X_m$ at respective picture-capture instants $t_0 \ldots t_m$, and a step 56 of processing the sectional images $X_0 \ldots X_m$ with the computer program 38.

In practice, the axis of rotation L is never exactly that set by the control unit 34. The invention therefore proposes to determine the axis of rotation L on the basis of the sectional images $X_0 \ldots X_m$, and then to determine a three-dimensional representation V on the basis of the axis of rotation L determined, rather than on the basis of the axis of rotation set on the basis of the adjustment of the control unit 34.

Furthermore, in practice, the motion of the object O is never perfectly rotary. The motion error with respect to the rotation of fixed axis is represented by a series of perturbation translations $T_1 \ldots T_m$, each perturbation translation being undergone by the object O between two respective successive sectional images $X_{k-1}$, $X_k$. The perturbation translations $T_1 \ldots T_m$ have variable direction and value.

Thus, the position of a point o of the object O at a picture-capture instant $t_k$, starting from the position u of the point o at the previous picture-capture instant $t_{k-1}$, is:

$$R_{\vec{a}, \tau(t_k - t_{k-1})}(u - u_0) + u_0 + T_k,$$

where $R_{\vec{a}, \tau(t_k - t_{k-1})}$ is the rotation matrix of angle $\tau(t_k - t_{k-1})$ about the axis with direction $\vec{a}$ passing through the origin of the XYZ reference frame. It will be noted that the rotation matrix $R_{\vec{a}, \alpha}$ of angle $\alpha$ about an axis with direction $\vec{a}$ passing through the origin is given, according to Rodrigues' formula, by:

$$R_{\vec{a}, \alpha} = I + \sin \alpha [\vec{a}]_x + (1 - \cos \alpha)[\vec{a}]_x^2,$$

where I is the 3-by-3 identity matrix, and $$[\vec{a}]_x = \begin{bmatrix} 0 & -a_3 & a_2 \\ a_3 & 0 & -a_1 \\ -a_2 & a_1 & 0 \end{bmatrix}$$

with $\vec{a} = (a_1, a_2, a_3)$.

It will also be noted that the perturbation translation $T_k$ does not depend on the position of $u_0$ on the axis of rotation L.

Processing of the Sectional Images Acquired

With reference to FIG. 3, the processing step 56 implemented by the computer program 38 comprises first of all a step 100 of extending each sectional image $X_0 \ldots X_m$, in the course of which values of points between the pixels s are calculated, as are values of points outside the grid G. For example, the values of the points between the pixels s are calculated by interpolation or by smoothing on the basis of the values of the pixels s of the grid G, while the values of the points outside the grid G are set to a low gray level, for example 0. Hereinafter, an arbitrary point of a sectional image, a pixel whose value is measured or a point whose value is calculated, will be denoted x, while a pixel proper of a sectional image will be denoted s. The value of a point x will be denoted $X_k(X)$, while the value of a pixel s will be denoted $X_k(S)$.

Step 56 implemented by the computer program 38 furthermore comprises a step 200 of determining the parameters of the motion of the object O with respect to the section plane P. In the course of this step of determining the parameters of the motion 200, the parameters of regular motion (angular rate $\tau$, the axis of rotation L) are determined, as are the perturbation motion parameters (series of perturbation translations $T_1 \ldots T_m$).

The motion parameters (angular rate $\tau$, the axis of rotation L and series of perturbation translations $T_1 \ldots T_m$) determine the position of the object O at each instant of capture $t_k$ of a sectional image $X_k$: the position at the instant of capture $t_k$ of a point o which is situated at the position u at the initial instant $t_0$ is given by:

$$R_{\vec{a}, \tau(t_k - t_0)}(u - u_0) + u_0 + \overline{T}_k,$$

where $\overline{T}_k = R_{\vec{a}, \tau(t_k - t_1)} T_1 + R_{\vec{a}, \tau(t_k - t_2)} T_2 + \ldots + R_{\vec{a}, \tau(t_k - t_{k-1})} T_{k-1} + T_k$, the cumulative translation aggregated from the initial instant $t_0$ to the instant $t_k$ of capture of the sectional image $X_k$, with $\overline{T}_0 = 0$.

The position of the object O at each instant of capture $t_k$ of a sectional image $X_k$ determines the position of the section plane P at the instant of capture $t_k$ in an arbitrary reference frame tied to the object O (and vice-versa): the position in the reference frame of the object O chosen (which coincides with the fixed XYZ reference frame at the initial instant of capture $t_0$) of a pixel s of the section plane P at the instant of capture $t_k$ is:

$$R_{\vec{a},\tau(t_k-t_0)}{}^t(\pi_3 s - u_0 - T_k) + u_0$$

with $R_{\vec{a},\tau(t_k-t_0)}{}^t$ the matrix transpose of $R_{\vec{a},\tau(t_k-t_0)}$, $$\pi_3 = \begin{bmatrix} 1 & 0 \\ 0 & 1 \\ 0 & 0 \end{bmatrix},$$

$\pi_3 x$ is the position in the XYZ three-dimensional reference frame of a point x of a sectional image, when merging the support plane of the sectional image with the XY plane. The position of the section plane P in any other reference frame tied to the object O at each instant of capture $t_k$ follows from the position of the section plane P in the reference frame of the object O chosen at the instant of capture $t_k$ and from the relation between the reference frame of the object chosen and this other reference frame.

In the description which follows, the motion of the object O with respect to the section plane P is expressed in the XYZ reference frame tied to the section plane P. Quite obviously, the motion of the object O with respect to the section plane P could be expressed in another frame of reference, which would not necessarily be tied to the section plane. In this case, the determination of the motion of the object O with respect to the section plane P would furthermore comprise the determination of the motion of the section plane P with respect to this other frame of reference.

Step 56 implemented by the computer program 38 furthermore comprises a step 400 of determining a three-dimensional representation V of the object O, on the basis of the sectional images $X_0 \ldots X_m$, and of the motion parameters $\tau$, L, $T_1 \ldots T_m$.

Determination of the Angular Rate in Absolute Value

The sign of the angular rate $\tau$ indicates the direction of the rotation of the motion. The sign of the angular rate $\tau$ is positive if the rotation occurs in the positive sense with respect to the direction $\vec{a}$, and negative if the rotation occurs in the negative sense with respect to the direction $\vec{a}$. The sign of the angular rate $\tau$ is known, for example, according to the adjustment of the imaging system 10, once the direction $\vec{a}$ of the axis of rotation has been chosen.

If the sign of the angular rate $\tau$ is not known, it may be chosen arbitrarily: in this case, the three-dimensional representation V of the object O will at worst be the three-dimensional representation V of the mirror of the object O.

With reference to FIG. 4, step 200 of determining the parameters of the motion comprises a step 210 of determining the angular rate in absolute value $|\tau|$.

This step 210 comprises first of all a step 212 of determining a period p>0 such that each pair of sectional images $X_k$, $X_{k'}$ captured at respective instants $t_k$, $t_{k'}$ separated by a time substantially equal to a (nonzero) multiple of the period p, are substantially similar. This period p is thus the period of revolution of the object O.

More precisely, step 212 of determining the period of revolution p comprises a step 214 of determining an initial group of positive candidate periods $p_1 \ldots p_n$, and a step 216 of selecting the period of revolution p from among the candidate periods $p_1 \ldots p_n$ of the initial group.

In the example described, the step 214 of determining the candidate periods $p_1 \ldots p_n$ consists in choosing the candidate periods $p_1 \ldots p_n$. Preferably, the candidate periods $p_1 \ldots p_n$ are chosen uniformly spaced.

Simple Determination of the Period

Step 216 of selecting the period of revolution p comprises, in a simple variant, the determination of the best period from among the candidate periods $p_1 \ldots p_n$, by maximizing the likelihood according to a chosen probabilistic model.

Enhanced Determination of the Period

However, to improve the reliability of the determination of the period of revolution p, one or more prior selections are carried out on the candidate periods $p_1 \ldots p_n$, the probabilistic model taking account of this or these selections.

With reference to FIG. 4, step 216 of selecting the period of revolution p comprises two steps 218, 220 of selection, so as to obtain, on the one hand, for each sectional image $X_k$, a first respective subset $p_{j(k,1)}, \ldots, p_{j(k,e)}$ of candidate periods and, on the other hand, for all the sectional images $X_0 \ldots X_m$, a second subset $p_{j(1)} \ldots p_{j(l)}$ of candidate periods.

Selection of the First Subsets

The first step 218 of selecting the first subsets $p_{j(k,1)}, \ldots, p_{j(k,e)}$ comprises, for each sectional image $X_k$ and for each candidate period $p_j$, a step 222 of determining substantially periodic sectional images $X_{k'}$ (according to the candidate period $p_j$) to the sectional image $X_k$.

Step 222 of determining the substantially periodic sectional images $X_{k'}$ comprises a step 224 of determining the sectional images $X_{k'}$ captured at picture-capture instants $t_{k'}$ separated from the instant $t_k$ of capture of the sectional image $X_k$ by a time which is close to a (nonzero) multiple of the candidate period $p_j$. "Close" signifies that the difference between the close time and the (nonzero) multiple of the candidate period $p_j$ lies in a time interval J comprising 0. Preferably, the time interval J is centered on 0. For example, $J=[\zeta,\zeta]$ with C small with respect to each candidate period $p_j$, with $\zeta \leq p_j/3$ for the set of candidate periods $p_j$. As a variant, $\zeta$ varies as a function of the candidate period $p_j$ by choosing for example $\zeta = p_j/10$ for each candidate period $p_j$.

The first step 218 of selecting the first subsets $\{p_{j(k,1)}, \ldots, p_{j(k,e)}\}$ furthermore comprises a step 226 of recentering each substantially periodic sectional image $X_k$, with respect to the sectional image $X_k$.

The recentering step 226 comprises first of all a step 228 of selecting luminous pixels, in the sectional image $X_k$ and in the substantially periodic sectional image $X_{k'}$. Preferably, the pixels selected are those whose gray level is greater than a predetermined threshold $\alpha$, this threshold being for example the q-quantile of gray level of the sectional images $X_0 \ldots X_m$ (this signifying that the proportion of the pixels of the sectional images $X_0 \ldots X_m$ which have a gray level of less than or equal to $\alpha$ is substantially equal to q, and that of the pixels which have a gray level greater than $\alpha$ is substantially equal to 1−q), with q being equal for example to between 60% and 95%.

The recentering step 226 furthermore comprises a step 230 of calculating, on the one hand, a first center $d(X_k)$ of the luminous points selected in the sectional image $X_k$ and, on the other hand, the calculation of a second center $d(X_{k'})$ of the luminous points selected in the sectional image $X_k$.

The center of an image X ($X_k$ or $X_{k'}$) is given by:

$$d(X) = \frac{\sum_s 1_{X(s)>\alpha} s}{\sum_s 1_{X(s)>\alpha}}$$

where $1_{A>B}$ is the indicator function: $1_{A>B}=1$ if A>B, and $1_{A>B}=0$ otherwise. The recentering step 226 furthermore comprises the determination 232 of a shift $d_{k,k'}$ between the centers of the luminous points of the sectional image $X_k$ and of the substantially periodic sectional image $X_{k'}$: $d_{k,k'}=d(X_k)-d(X_{k'})$.

The recentering step 226 furthermore comprises a step 234 of translating the substantially periodic sectional image $X_{k'}$ by the shift $d_{k,k'}$ between the centers, so as to obtain a centered substantially periodic sectional image, denoted Trans($X_{k'}$, $d_{k,k'}$). The centered substantially periodic sectional image Trans($X_{k'}$,$d_{k,k'}$) is calculated, for each pixel s, by:

$$\text{Trans}(X_{k'},d_{k,k'})(s) = X_{k'}(s-d_{k,k'}).$$

The first step 218 of selecting the first subsets $p_{j(k,1)}, \ldots, p_{j(k,e)}$ furthermore comprises a step 236 of determining a distance T(k,k') between the sectional image $X_k$ and each centered substantially periodic sectional image Trans($X_{k'}$, $d_{k,k'}$). Preferably, the distance T(k,k') is given by the following relation:

$$\forall 0 \le k,k' \le m, T(k,k') = \chi(X_k, \text{Trans}(X_{k'},d_{k,k'})),$$

with $\chi$ a distance function, $\chi(X,Y)$ measures the difference between two images X and Y. The distance function $\chi$ is for example a quadratic distance of the gray levels of the pixels between the two images, given by:

$$\chi(X, Y) = \sum_s (X(s) - Y(s))^2.$$

The first step 218 of selecting the first subsets $p_{j(k,1)}, \ldots, p_{j(k,e)}$ furthermore comprises a step 238 of determining a periodic similitude level $\text{sim}(X_k,p_j)$ of the sectional image $X_k$ on the basis of the distances T(k,k').

The periodic similitude level $\text{sim}(X_k,p_j)$ characterizes the level of similitude of the sectional image $X_k$ with the substantially periodic sectional images $X_{k'}$, for the candidate period $p_j$. Preferably, step 238 of determining a periodic similitude level $\text{sim}(X_k,p_j)$ comprises a step of calculating the inverse of the similitude through the following relation:

$$\text{sim}^{-1}(X_k, p_j) = \begin{cases} \sum_{r \ne 0} v(k,j,r) / \sum_{r \ne 0} h(k,j,r) & \text{if } \sum_{r \ne 0} h(k,j,r) > 0 \\ \infty & \text{otherwise.} \end{cases}$$

with:

$$v(k,j,r) = \sum_{i:-\zeta \le t_i - rp_j \le \zeta} w(t_i - rp_j) T(k,i),$$

$$h(k,j,r) = \sum_{i:-\zeta \le t_i - rp_j \le \zeta} w(t_i - rp_j),$$

where r is a nonzero integer, $\zeta$ is defined in the same manner as for step 224 of determining the substantially periodic sectional images, and w is a positive weighting function defined on the interval $J=[-\zeta,\zeta]$. Preferably, w is symmetric with respect to 0 (w(t)=w(-t)), and the high values of w are concentrated around 0. For example $w(t)=\exp(-ct^2)$ with c a positive constant. The function w makes it possible to decrease the influence of the substantially periodic sectional images $X_{k'}$ which are far distant from a multiple of the candidate period $p_j$.

The first step 218 of selecting the first subsets $p_{j(k,1)}, \ldots, p_{j(k,e)}$ furthermore comprises a step 240 of selecting, from among the candidate periods $p_1 \ldots p_n$, for each sectional image $X_k$, a first subset $p_{j(k,1)}, \ldots, p_{j(k,e)}$ grouping together the candidate periods $p_1 \ldots p_n$ having the highest similitude levels (that is to say the smallest values of $\text{sim}^{-1}(X_k,p_j)$). Preferably, a predetermined number e of candidate periods are selected. Preferably also, this number e is chosen between 1 and 15.

Selection of the Second Subset

The second step 220 of selecting the second subset $p_{j(1)} \ldots p_{j(l)}$ of candidate periods comprises, for each candidate period $p_j$, a step 242 of calculating a number of appearances $S(p_j)$ of the candidate period $p_j$, corresponding to the number of first subsets $p_{j(k,1)}, \ldots, p_{k(k,e)}$ in which the candidate period $p_j$ appears.

The values of the number of appearances S for the candidate periods $p_1 \ldots p_n$ are for example given by the relation:

$$\forall 1 \le j \le n, S(p_j) = \sum_{k=0}^m 1_{p_j \in \{p_{j(k,1)}, \ldots, p_{j(k,e)}\}},$$

where $1_{A \in B}$ is the indicator function: $1_{A \in B}=1$ if $A \in B$, and $1_{A \in B}=0$ otherwise.

The second step 220 of selecting the second subset $p_{j(1)} \ldots p_{j(l)}$ of candidate periods furthermore comprises, for each candidate period $p_j$, a step 244 of calculating a dispersion $\mathfrak{S}$ of the values of the number of appearance S, about each multiple (greater than or equal to 1) of the candidate period $p_j$. The dispersions for a candidate period $p_j$ indicates whether high values of the number of appearance S are concentrated (low dispersion) or dispersed (high dispersion) around each multiple (greater than or equal to 1) of the candidate period $p_j$.

Preferably, the dispersion $\mathfrak{S}$ of a candidate period $p_j$ is calculated in such a way that, the more distant another candidate period $p_i$ is from the closest multiple (greater than or equal to 1) of the candidate period $p_j$, the more the value of the number of appearance S of this other candidate period $p_i$ contributes to the dispersion.

Preferably, the dispersion $\mathfrak{S}$ of the candidate period $p_j$ is given by the relation:

$$\forall 1 \le j \le n, \mathfrak{S}(p_j) = \sum_{i=1}^n \frac{\left|\left[\frac{p_i}{p_j}\right]p_j - p_i\right|}{p_j} S(p_i),$$

where [x] is the integer closest to x.

The second step 220 of selecting the second subset $p_{j(1)} \ldots p_{j(l)}$ of candidate periods furthermore comprises a step 246 of selecting, from among the candidate periods $p_j$, of the second subset $p_{j(1)} \ldots p_{j(l)}$, candidate periods having the lowest dispersions $\mathfrak{F}$. Preferably, a predetermined number l of candidate periods are selected. Preferably also, this number l is chosen between 4 and 40.

Selection of the Period on the Basis of the First Subsets, of the Second Subset, and of a Probability Law The selection 216 of the period of revolution p furthermore comprises a step 248 of determining a probability law $P_p$ describing the probability that a period $p_j$ is chosen, in the course of step 218, in at least one of the first sets $p_{j(k,1)}, \ldots p_{j(k,e)}$. The probability law $P_p$ is defined with the period of revolution p as parameter.

The selection 216 of the period of revolution p furthermore comprises a step 249 of calculating a histogram h of the candidate periods selected in step 218. It has been noted that the large values of the histogram h are in general concentrated around the true value of the period of revolution p and multiples of the true value of the period of revolution p.

Preferably, it is considered that the selections for obtaining the candidate periods in step 218 are approximately independent, and that the choosing of each of the candidate periods in step 218 is carried out randomly according to a probability law $P_p$.

For this purpose, the probability law $P_p$, having as parameter the period of revolution p, is such that the shape of the probability function $P_p$ can "hug" that of the histogram h to within an expansion factor, by varying the value of the parameter p.

More precisely, it is considered than each period $p_j$ obtained in step 218 is selected either randomly, with a low probability β, from among all the candidate periods $p_1 \ldots p_n$ according to the uniform law, or with the probability 1−β through an alternative choice which consists in choosing a period around a multiple (greater than or equal to 1) of the period of revolution p. This alternative choice is carried out by choosing firstly a multiple ip (i an integer and i≥1) with a probability $b_i$ and thereafter by choosing $p_j$ around ip (ip already being chosen) with the probability $\bar{v}_{ip}(p_j)$.

In this case, the probability law $P_p$ is defined by the relation:

$$\forall 1 \le j \le n, P_p(p_j) = \frac{\beta}{n} + (1-\beta)\sum_{i=1}^{l(p)} b_i \bar{v}_{ip}(p_j),$$

where l(p) is the number of multiples of p.

The law $P_p$ is a mixture of the uniform law on the set of candidate periods $p_1 \ldots p_n$, and of the laws $\bar{v}_{ip}$ with $1 \le i \le l(p)$.

The probability $\bar{v}_{ip}(p_j)$ is preferably the translation of a support function v by the value ip: $v_{ip}(x)=v(x-ip)$. Preferably, the support function v is chosen finite and positive so as to define $b_i$ and $\bar{v}_{ip}$. Preferably also, v is symmetric about 0 (that is to say $v(-x)=v(x)$) and centered on 0. For example, we shall take $v(x) \propto e^{-dx^2} 1_{|x|\le\delta}$, or else $v(x) \propto (\delta-|x|) 1_{|x|\le\delta}$ for d and δ given positive constants.

Preferably $l(p)=\max\{i \in \mathbb{N}^*:\{p_1, \ldots, p_n\} \cap \text{supp}(v_{ip}) \ne \emptyset\}$, with $\text{supp}(v_{ip})=\{x:v_{ip}(x)\ne 0\}$, and $\bar{v}_{ip}(p_j)=v_{ip}(p_j)/c_i$, $$b_i = \frac{c_i}{\sum_{k=1}^{l(p)} c_k}, \text{ with } c_i = \sum_{k=1}^{n} v_{ip}(p_k).$$

In practice β is chosen between 0 and 25%.

The selecting 216 of the period of revolution p furthermore comprises a step 250 of determining the period of revolution p, as being the period of the second subset of candidate periods $p_{j(1)} \ldots p_{j(l)}$ which maximizes the likelihood Like (p) (or, equivalently, the log-likelihood log Like (p)) associated with the above probability law $P_p$, given the first subsets of selected periods $p_{j(k,1)}, \ldots, p_{j(k,e)}$, $0 \le k \le m$. The log-likelihood is given by:

$$\log \text{Like}(p) = \sum_{j=1}^{n} S(p_j) \log P_p(p_j).$$

As a variant, step 212 of determining the period of revolution p does not comprise step 220 of determining the second subset, and, in step 250, the period of revolution p is determined as being the period of the set of candidate periods $p_1 \ldots p_n$, maximizing the above likelihood Like (p).

Step 210 of determining the angular rate in absolute value $|\tau|$ then comprises a step 252 of calculating the angular rate in absolute value $|\tau|$ on the basis of the period of revolution p:

$$|\tau|=2\pi/p.$$

Once the direction $\vec{a}$ of the axis of rotation has been chosen, the angular rate τ is determined from the known (or assumed) direction of rotation with respect to the direction $\vec{a}$ of the axis of rotation, through the following relation:

$$\tau = \begin{cases} 2\pi/p & \text{for positive rotations} \\ -2\pi/p & \text{for negative rotations.} \end{cases}$$

Step 200 of determining the parameters of the motion furthermore comprises a step 300 of determining the axis of rotation L and the series of perturbation translations $T_1 \ldots T_m$.

First Variant for Determining the Axis of Rotation and the Series of Perturbation Translations FIG. 5 illustrates a first variant of step 300 of determining the axis of rotation L and the series of perturbation translations $T_1 \ldots T_m$.

Step 300 of determining the axis of rotation L and the series of perturbation translations $T_1 \ldots T_m$ is implemented by determining an axis of rotation L and a series of perturbation translations $T_1 \ldots T_m$ such that the value $X_k(s)$ of each pixel s of each sectional image $X_k$ is substantially equal, for each spatially neighboring sectional image $X_{k'}$ (that is to say whose support plane $P_{k'}$ is spatially neighboring the support plane $P_k$ of the sectional image $X_k$), to the value $X_{k'}(x')$ of a point x' "close" to this pixel s, on the spatially neighboring sectional image $X_{k'}$. The closest point x' is determined according to a given proximity criterion.

More precisely, step 300 of determining the axis of rotation L and the series of perturbation translations $T_1 \ldots T_m$ comprises a step 304 of determining, for each sectional image $X_k$, sectional images $X_{k'}$ spatially neighboring this sectional image $X_k$.

A sectional image $X_{k'}$ is spatially neighboring the sectional image $X_k$, when the angle separating their respective support planes $P_k$, $P_{k'}$ is less than a predetermined value $\Delta_1$. The angle is preferably determined on the basis of the angular rate in absolute value $|\tau|$ and of the instants $t_k$, $t_{k'}$ of capture of the two sectional images $X_k$, $X_{k'}$. This predetermined value $\Delta_1$ is preferably taken less than or equal to 12 degrees. For a sectional image $X_k$, the spatially neighboring sectional images $X_{k'}$ are therefore the sectional images satisfying:

there exists an integer q such that $|\tau|(t_k-t_{k'})=2\pi q+r$, with $|r| \le \Delta_1$.

The previous condition on the angle separating the sectional images $X_k$ and $X_{k'}$ is equivalent to a condition on the time interval separating the captures of the two sectional images.

Step 300 of determining the axis of rotation L and the series of perturbation translations $T_1 \ldots T_m$ furthermore comprises a step 306 of choosing a proximity criterion.

With reference to FIG. 6, preferably, this proximity criterion is that the point x' of a spatially neighboring sectional image $X_{k'}$, closest to a pixel s of the sectional image $X_k$, is the position $\text{Proj}_{k,k'}(s) = x'$ of the orthogonal projection o' of a point o of the object O on the support plane $P_k$ of the sectional image $X_k$, situated on the pixel s of the sectional image $X_k$, on the support plane $P_{k'}$ of the spatially neighboring image $X_{k'}$.

This choice of this proximity criterion is particularly suitable in the case of a point spread function having an elongate shape perpendicularly to the section plane P.

Thus, returning to FIG. 5, step 300 of determining the axis of rotation L and the series of perturbation translations $T_1 \ldots T_m$ furthermore comprises a step 308 of calculating the orthogonal projection $F_{k,k'}(X_k)$ of the sectional image $X_k$ on the support plane $P_{k'}$ of each spatially neighboring sectional image $X_{k'}$ of the sectional image $X_k$.

Preferably, step 308 of calculating the orthogonal projection $F_{k,k'}(X_k)$ is carried out by calculating an affine transformation $\text{Aff}(Q_{k,k'}, v_{k,k'}, X_k)$ of the sectional image $X_k$, the affine transformation $\text{Aff}(Q_{k,k'}, v_{k,k'}, X_k)$ having a linear transformation component $Q_{k,k'}(\vec{a}, \tau)$ and a translation component $v_{k,k'}(u_0, \vec{a}, \tau, T_1 \ldots T_m)$ which are dependent on, respectively, on the one hand, the direction $\vec{a}$ of the value of axis of rotation and the rotation rate $\tau$ and, on the other hand, the value of axis of rotation L, the rotation rate $\tau$ and the value of series of perturbation translations $T_1 \ldots T_m$. Thus:

$$F_{k,k'}(X) = \text{Aff}(Q_{k,k'}(\vec{a}, \tau), v_{k,k'}(u_0, \vec{a}, \tau, T_1 \ldots T_m), X),$$

with $\text{Aff}(Q,v,X)$ the affine transform of X defined by:

$$\forall x, \text{Aff}(Q,v,X)(x) = X(Q^{-1}(x-v))$$

with Q an invertible 2×2 matrix and v a translation vector, and $$Q_{i,j}(\vec{a}, \tau) = \pi_2 R_{\vec{a}, \tau(t_j - t_i)} \pi_3,$$

$$v_{i,j}(u_0, \vec{a}, \tau, T_1 \ldots T_m) = (\pi_2 - \pi_2 R_{\vec{a}, \tau(t_j - t_i)}) u_0 + \pi_2 \overline{T}_j - \pi_2 R_{\vec{a}, \tau(t_j - t_i)} \overline{T}_i,$$

where $$\pi_2 = \begin{bmatrix} 1 & 0 & 0 \\ 0 & 1 & 0 \end{bmatrix}$$

is the projection on the XY plane, $$\pi_3 = \begin{bmatrix} 1 & 0 \\ 0 & 1 \\ 0 & 0 \end{bmatrix},$$

$\pi_3 x$ is the position in the XYZ three-dimensional reference frame of a point x of a sectional image, when merging the support plane of the sectional image with the XY plane, and $\overline{T}_k = R_{\vec{a}, \tau(t_k - t_1)} T_1 + R_{\vec{a}, \tau(t_k - t_2)} T_2 + \ldots + R_{\vec{a}, \tau(t_k - t_{k-1})} T_{k-1} + T_k$, the aggregated translation from the initial instant $t_0$ to the instant $t_k$ of capture of the sectional image $X_k$ with $\overline{T}_0 = 0$, and it is noted that for each possible direction $\vec{a}$ of the axis of rotation, the sign of the angular rate $\tau$ is determined from the known (or assumed) direction of rotation with respect to the direction $\vec{a}$ of the axis of rotation, for example according to the adjustment of the imaging system 10, through the following relation:

$$\tau = \begin{cases} |\tau| & \text{for positive rotations} \\ -|\tau| & \text{for negative rotations,} \end{cases}$$

(if the direction of rotation is chosen arbitrarily: in this case, the three-dimensional representation V of the object O will at worst be the three-dimensional representation V of the mirror of the object O).

Step 300 of determining the axis of rotation L and the series of perturbation translations $T_1 \ldots T_m$ furthermore comprises a step 310 of comparing the values $X_k(s)$ of the pixels s of each sectional image $X_k$ with the values $X_k(x')$ of the points x' closest to the spatially neighboring sectional images $X_{k'}$. Preferably, the comparison step 310 is carried out by calculating a distance $\chi(\text{Aff}(Q_{k,k'}, v_{k,k'}, X_k), X_{k'})$ between the affine transform $\text{Aff}(Q_{k,k'}, v_{k,k'}, X_k)$ of the sectional image $X_k$ and the neighboring sectional image $X_{k'}$.

Step 300 of determining the axis of rotation L and the series of perturbation translations $T_1 \ldots T_m$ furthermore comprises a step 312 of determining an axis of rotation L and a series of perturbation translations $T_1 \ldots T_m$ whose values minimize a cost function E comprising a first part dependent on the calculated distances, so that the reduction in the calculated distances gives rise to the reduction in the cost function E.

Preferably, the cost function E also comprises a second part which depends, for a series of perturbation translations $T_1 \ldots T_m$, on the amplitude of the translations of the series of perturbation translations $T_1 \ldots T_m$. This second part thus comprises a regularization function Reg, which gives a low value when the translations of the series of perturbation translations $T_1 \ldots T_m$ have a low amplitude, and gives a high value in the converse case. The regularization function Reg is preferably a quadratic norm, for example given by the relation:

$$\text{Reg}(T_1 \ldots T_m) = \|T\|_M^2 = T^T M T,$$

with M a symmetric positive definite matrix, and $T = T_1 \ldots T_m$ may be written in the form of a column vector with the translations $T_k$ one after the other. For example, $M = I_{3m}$, the 3m×3m identity matrix.

Preferably, the cost function E is given by the following relation:

$$E(\vec{a}, x_0, T_1 \ldots T_m) = \sum_k \sum_{k' \in N_k} \chi(F_{k,k'}(X_k), X_{k'}) + \lambda \text{Reg}(T_1 \ldots T_m),$$

with $N_k$ the set of indices of the sectional images spatially neighboring the sectional image $X_k$, $\chi(F_{k,k'}(X_k), X_{k'})$ a measure of the distance between, on the one hand, the projection $F_{k,k'}(X_k)$ of the sectional image $X_k$ on the support plane $P_{k'}$ of the spatially neighboring sectional image $X_{k'}$ and, on the other hand, the spatially neighboring sectional image $X_{k'}$, and $\lambda \geq 0$ is a parameter of compromise between, on the one hand, the distances between the projections $F_{k,k'}(X_k)$ of the sectional images $X_k$ and the spatially neighboring sectional images $X_{k'}$ of the sectional, images $X_k$, and, on the other hand, the regularization of translations $T_1 \ldots T_m$.

Second Variant for Determining the Axis of Rotation and the Series of Perturbation Translations A second variant of step 300 of determining the axis of rotation L and the series of perturbation translations $T_1 \ldots T_m$ is represented in FIG. 7. This second variant of step 300 employs certain steps of the first variant of step 300.

With reference to this figure, step 300 of determining the axis of rotation L and the series of perturbation translations $T_1 \ldots T_m$ comprises, the angular rate in absolute value $|\tau|$ being known, a step 314 of determining the direction $\vec{a}$ of the axis of rotation L, before a step 326 of determining a point of passage $u_0$ of the axis of rotation L and of the series of perturbation translations $T_1 \ldots T_m$.

Determination of the Direction of the Axis of Rotation

Step 314 of determining the direction $\vec{a}$ of the axis of rotation L comprises a step 316, identical to the previous step 304, of determining, for each sectional image $X_k$, the spatially neighboring sectional images $X_{k'}$ of this sectional image $X_k$.

Step 314 of determining the direction $\vec{a}$ of the axis of rotation L furthermore comprises a step 318, identical to the previous step 306, of choosing a proximity criterion, according to which the point x' of a spatially neighboring sectional image $X_{k'}$, closest to a pixel s of the sectional image $X_k$, is the position $\text{Proj}_{k,k'}(s)$ of the orthogonal projection o' of the point of the object o merged with the pixel s of the sectional image $X_k$, on the support plane $P_{k'}$ of the spatially neighboring image $X_{k'}$.

Thus, step 314 of determining the direction $\vec{a}$ of the axis of rotation L furthermore comprises a step 320 of calculating the orthogonal projection $F_{k,k'}(X_k)$ of the sectional image $X_k$ on the support plane $P_{k'}$ of each spatially neighboring sectional image $X_{k'}$ of the sectional image $X_k$.

Preferably, step 320 of calculating the orthogonal projection $F_{k,k'}(X_k)$ is carried out by calculating an affine transformation $\text{Aff}(Q_{k,k'}, v_{k,k'}, X_k)$ of the sectional image $X_k$, the affine transformation $\text{Aff}(Q_{k,k'}, v_{k,k'}, X_k)$ having a linear transformation component $Q_{k,k'}(\vec{a}, \tau)$ and a translation component $v_{k,k'}$. The linear transformation component $Q_{k,k'}(\vec{a}, \tau)$ is a function of a direction $\vec{a}$ of axis of rotation and of the rotation rate $\tau$, while, unlike in the first variant, the translation component $v_{k,k'}$ is considered to be a variable, and is therefore not expressed as a function of the motion parameters of the object O. The family of translation vectors in the affine transformations $F_{k,k'}$ will be denoted hereinafter $v = (v_{k,k'})_{0 \leq k \leq m, k' \in N_k}$. The orthogonal projection $F_{k,k'}(X_k)$ is therefore expressed in the following manner:

$$F_{k,k'}(X) = \text{Aff}(Q_{k,k'}(\vec{a}, \tau), v_{k,k'}, X),$$

with $\text{Aff}(Q, v, X)$ the affine transform of X defined by:

$$\forall x, \text{Aff}(Q, v, X)(x) = X(Q^{-1}(x-v))$$

with Q an invertible 2×2 matrix and v a translation vector, and $$Q_{i,j}(\vec{a}, \tau) = \pi_2 R_{\vec{a}, \tau(t_j - t_i)} \pi_3,$$

where $$\pi_2 = \begin{bmatrix} 1 & 0 & 0 \\ 0 & 1 & 0 \end{bmatrix}$$

is the projection on the XY plane, $$\pi_3 = \begin{bmatrix} 1 & 0 \\ 0 & 1 \\ 0 & 0 \end{bmatrix},$$

$\pi_3 x$ is the position in the XYZ three-dimensional reference frame of a point x of a sectional image, when merging the support plane of the sectional image with the XY plane, and it is noted that for each possible direction $\vec{a}$ of the axis of rotation, the sign of the angular rate $\tau$ is determined from the known (or assumed) direction of rotation with respect to the direction $\vec{a}$ of the axis of rotation, for example according to the adjustment of the imaging system 10, by the following relation:

$$\tau = \begin{cases} |\tau| & \text{for positive rotations} \\ -|\tau| & \text{for negative rotations,} \end{cases}$$

(if the direction of rotation is chosen arbitrarily: in this case, the three-dimensional representation V of the object O will at worst be the three-dimensional representation V of the mirror of the object O).

Step 314 of determining the direction $\vec{a}$ of the axis of rotation L furthermore comprises a step 322 of comparing the values $X_k(s)$ of the pixels s of each sectional image $X_k$ with the values $X_{k'}(x')$ of the points x' closest to the spatially neighboring sectional images $X_{k'}$. Preferably, the comparison step 322 is carried out by calculating a distance $\chi(\text{Aff}(Q_{k,k'}, v_{k,k'}, X_k), X_{k'})$ between the affine transform $\text{Aff}(Q_{k,k'}, v_{k,k'}, X_k)$ of the sectional image $X_k$ and the neighboring sectional image $X_{k'}$.

Step 314 of determining the direction $\vec{a}$ of the axis of rotation L furthermore comprises a step 324 of minimizing a cost function U, in which the translation components $v_{k,k'}$ are not expressed as a function of the parameters of the motion, but are left as variables of the cost function U.

Step 324 of minimizing the cost function U therefore amounts to finding the direction $\vec{a}$ of axis of rotation and the family of translation components $v_{k,k'}$ which minimize the cost function U.

Preferably, the cost function U is given by the relation:

$$U(\vec{a}, v) = \sum_{k} \sum_{k' \in N_k} \chi(\text{Aff}(Q_{k,k'}(\vec{a}, \tau), v_{k,k'}, X_k), X_{k'}),$$

with $N_k$ the set of indices of the sectional images neighboring the sectional image $X_k$, $\chi(\text{Aff}(Q_{k,k'}(\vec{a}, \tau), v_{k,k'}, X_k), X_{k'})$ a measure of the distance between the affine transform of the sectional image $X_k$ and the spatially neighboring sectional image $X_{k'}$.

In the previous definition of the cost function U, the translation components $v_{k,k'}$ are variables independent of $u_0$, $\vec{a}, \tau, T_1 \ldots T_m$.

Determination of a Point of Passage of the Axis of Rotation and of the Series of Perturbation Translations The direction $\vec{a}$ of the axis of rotation L and of the translation components $v_{k,k'}$, subsequently called the reference translation components $v_{k,k'}$, having been determined, step 326 of determining a point of passage $u_0$ of the axis of rotation L and the series of perturbation translations $T_1 \ldots T_m$ comprises a step 328 of expressing translation components $v_{k,k'}(u_0, \vec{a}, \tau, T_1 \ldots T_m)$ as a function of a series of perturbation translations $T_1 \ldots T_m$ and of a point of passage $u_0$, the direction $\vec{a}$ of the axis of rotation L and the rotation rate $\tau$ being known:

$$v_{k,k'}(u_0, \vec{a}, \tau, T_1 \ldots T_m) = (\pi_2 - \pi_2 R_{\vec{a}, \tau(t_k-t_k)}) u_0 + \pi_2 T_{k'} - \pi_2 R_{\vec{a}, \tau(t_{k'}-t_k)} T_k,$$

where $T_k = R_{\vec{a}, \tau(t_k-t_1)} T_1 + R_{\vec{a}, \tau(t_k-t_2)} T_2 + \ldots + R_{\vec{a}, \tau(t_k-t_{k-1})} + T_k$, the aggregated translation from the initial instant $t_0$ to the instant $t_k$ of capture of the sectional image $X_k$ with $T_0 = 0$.

Step 326 of determining a point of passage $u_0$ of the axis of rotation L and the series of perturbation translations $T_1 \ldots T_m$ furthermore comprises a step 330 of determining the series of perturbation translations $T_1 \ldots T_m$ and the point of passage $u_0$, such that the translation components $v_{k,k'}(u_0, \vec{a}, \tau, T_1 \ldots T_m)$ approximate the reference translation components $v_{k,k'}$.

Preferably, step 330 of determining the series of perturbation translations $T_1 \ldots T_m$ and the point of passage $u_0$ comprises a step 332 of minimizing a cost function K which comprises a first part representing, for a series of perturbation translations $T_1 \ldots T_m$ and a point of passage $u_0$, a distance between the reference translation components $v_{k,k'}$ and the translation components $v_{k,k'}(u_0, \vec{a}, \tau, T_1 \ldots T_m)$ expressed as a function of the series of perturbation translations $T_1 \ldots T_m$ and of the point of passage $u_0$.

Preferably also, the cost function K comprises a second part representing the regularization Reg of the value $T_1 \ldots T_m$ of series of perturbation translations whose minimization reduces the amplitude of the translations $T_1 \ldots T_m$. The regularization function Reg is preferably a quadratic norm, for example given by the relation:

$$Reg(T_1 \ldots T_m) = \|T\|_M^2 = T^T M T,$$

with M a symmetric positive definite matrix, and $T = T_1 \ldots T_m$ may be written in the form of a column vector with the translations $T_k$ one after the other. For example, $M = I_{3m}$, the 3 m×3 m identity matrix.

Preferably, the cost function K is given by the relation:

$$K(x_0, T_1 \ldots T_m) = \sum_k \sum_{k' \in N_k} \|v_{k,k'} - v_{k,k'}(\vec{a}, \tau, T_1 \ldots T_m, x_0)\|^2 + \alpha Reg(T_1 \ldots T_m),$$

with $\alpha \geq 0$ a compromise between the quadratic discrepancy between $v_{k,k'}$ and $v_{k,k'}(u_0, \vec{a}, \tau, T_1 \ldots T_m)$, and the regularization of $T_1 \ldots T_m$ to control the amplitude of the translations $T_1 \ldots T_m$.

Third Variant for Determining the Axis of Rotation and the Series of Perturbation Translations A third variant of step 300 of determining the axis of rotation L and the series of perturbation translations $T_1 \ldots T_m$ is represented in FIG. 8.

With reference to this FIG. 8, step 300 of determining the axis of rotation L and the series of perturbation translations $T_1 \ldots T_m$ comprises a step 334 of determining the direction $\vec{a}$ of the axis of rotation L, in the course of which the perturbation translations $T_1 \ldots T_m$ are considered to be negligible (thereby signifying that the motion of the object O is considered to be a stable rotation about the axis of rotation L), Determination of the Direction of the Axis of Rotation Step 334 of determining the direction $\vec{a}$ comprises a step 336 of determining a projection $L_{XY}$ of the axis of rotation L on the section plane P, on the basis of the sectional images $X_0 \ldots X_m$.

Determination of a Projection of the Axis of Rotation on the Section Plane

The procedure for determining the projection $L_{XY}$ uses the fact that each pixel s and its symmetric point $L_{XY}(s)$ on the section plane P with respect to the projection $L_{XY}$ have histograms $h_s$ and $h_{L_{XY}(s)}$ which are close. This is due to the fact that, in the course of a rotation of the object O, the pixel s and its symmetric point $L_{XY}(s)$ take substantially the same values, with simply a time shift corresponding to the time taken by the point o of the object O to move from the pixel s to its symmetric point $L_{XY}(s)$.

In the course of step 336, the projection $L_{XY}$ of the axis of rotation L on the section plane P is determined by choosing the line $l_{XY}$ of the section plane P having the highest level of symmetry of histograms, that is to say, such that the histograms $h_s$ and $h_{l_{XY}(s)}$ of each pixel s and of its symmetric point $l_{XY}(s)$ are close.

Thus, step 336 of determining a projection $L_{XY}$ comprises, for each pixel s of the grid G, a step 338 of calculating a histogram $h_s$ of the gray levels taken by this pixel s in at least a part of the sectional images $X_0, \ldots, X_m$. The histogram $h_s$ represents the countdown of the values of the pixel s, without taking account of the order in which these values appear in the sequence of sectional images $X_0, \ldots, X_m$.

Preferably, the part of sectional images corresponds to the sectional images $X_0, \ldots, X_{m'}$ (with m'≤m) acquired while the object O carries out an integer number of rotations about the axis of rotation L. This results in:

$$t_{m'} - t_0 \approx \frac{2\pi r}{|\tau|} \text{ for an integer number } r.$$

Step 336 of determining a projection $L_{XY}$ furthermore comprises a step 340 of determining, for each pixel s of the grid G and for a line $l_{XY}$ of the section plane P, a histogram $h_{l_{XY}(s)}$ of the gray levels taken by the symmetric point $l_{XY}(s)$ of this pixel s in the previous part of the sectional images.

Step 336 of determining a projection $L_{XY}$ furthermore comprises a step 342 of determining the distances $\Delta(h_s, h_{l_{XY}(s)})$ between the histogram $h_s$ of each pixel s and the histogram $h_{l_{XY}(s)}$ of the symmetric point $l_{XY}(s)$. The distance $\Delta$ is for example the distance of Kolmogorov-Smirnov type:

$$\Delta(h, h') = \sup_x |\bar{h}(x) - \bar{h}'(x)|, \text{ with } \bar{h}(x) = \sum_{y \leq x} h(y).$$

Step 336 of determining a projection $L_{XY}$ furthermore comprises a step 344 of minimizing a cost function $\Psi$, which represents, for a line $l_{XY}$ of the section plane P, the differences between the histogram $h_s$ of each pixel s and the histogram $h_{l_{XY}(s)}$ of the symmetric point $l_{XY}(s)$ with respect to the line $l_{XY}$. Preferably, the cost function $\Psi$ is given by the relation:

$$\Psi(l_{XY}) = \sum_{s \in G} \Delta(h_s, h_{l_{XY}(s)}).$$

$L_{XY}$ is determined as being the line $l_{XY}$ on the XY plane which minimizes the cost function $\Psi$.

Determination of the Angle Between the Axis of Rotation and its Projection

Step 334 of determining the direction $\vec{a}$ furthermore comprises a step 346 of determining the angle between the axis of rotation L and its projection $L_{XY}$ on the section plane P. This angle between the axis of rotation L and its projection $L_{XY}$ is determined by calculating the angle $\theta$ between the Z axis of the XYZ reference frame (perpendicular to the section plane P) and the axis of rotation L.

With reference to FIG. 9, step 346 of determining the angle $\theta$ uses the fact that points o of the object O describe, in the course of time, a respective circle, centered substantially on the axis of rotation L, this circle cutting the section plane P, on the one hand, at a pixel s and, on the other hand, at its symmetric point $L_{XY}(s)$ with respect to the projection $L_{XY}$.

Returning to FIG. 8, step 346 of determining the angle $\theta$ comprises a step 348 of determining, for each pixel s of the grid G, a time $t(s)$, termed the symmetrization time. The symmetrization time $t(s)$ of a pixel s is the time required for a point o of the object O to move from this pixel s to the symmetric point $L_{XY}(s)$ with respect to the projection $L_{XY}$.

This results in the fact that the value $X_k(s)$ of a pixel s on a sectional image $X_k$ captured at an instant $t_k$ is substantially equal to the value $X_{k'}(L_{XY}(s))$ of the symmetric point $L_{XY}(s)$ on a sectional image $X_{k'}$ captured at an instant $t_{k'}$ shifted substantially by the symmetrization time $t(s)$ with respect to the instant of capture $t_k$.

Thus, the symmetrization time $t(s)$ is preferably determined by determining the best temporal offset between the two vectors $(X_0(s), X_1(s), \ldots, X_m(s))$ and $(X_0(L_{XY}(s)), X_1(L_{XY}(s)), \ldots, X_m(L_{XY}(s)))$. Thus, the vector offset by time $\mu$ of the vector $(X_0(L_{XY}(s)), X_1(L_{XY}(s)), \ldots, X_m(L_{XY}(s)))$ is defined by $v(\mu)=(X_{q(t_0+\mu)}(L_{XY}(s)), X_{q(t_1+\mu)}(L_{XY}(s)), \ldots, X_{q(t_{j(\mu)}+\mu)}(L_{XY}(s)))$, with $j(\mu)$ such that $j(\mu)+1$ is the number of images captured between the instant $t_0$ and the instant $t_m-\mu$, and $q(t)$ such that the instant of capture $t_{q(t)}$ is the instant closest to the instant t from among all the instants of capture of sectional images. Preferably, the offset error is given by $$Err(\mu)=\kappa((X_0(s), X_1(s), \ldots, X_{j(\mu)}(s)), v(\mu)),$$

with $\kappa(u,v)$ a measure of distance between two vectors u and v, $\kappa$ is chosen for example as being a normalized quadratic distance:

$$\kappa(u, v) = \frac{1}{l} \sum_i (u_i - v_i)^2$$

with l the length of the vectors. Thus $t(s)$ is obtained by minimizing the offset error Err ($\mu$):

$$t(s) = \arg\min_{0 \le \mu < p} Err(\mu),$$

with $p=2\pi/|\tau|$ the period of revolution.

Step 346 of determining the angle $\theta$ furthermore comprises a step 350 of determining the angle $\theta$ on the basis of the symmetrization times $t(s)$.

Step 350 of determining the angle $\theta$ on the basis of the symmetrization times $t(s)$ comprises a step 352 of determining a direction $\vec{b}$ of the projection $L_{XY}$, with $\|\vec{b}\|=1$, as well as a point of passage $y_0$ of the projection $L_{XY}$. The projection $L_{XY}$ is determined by its direction and the point of passage ($y_0$, $\vec{b}$). The direction $\vec{b}$ of the projection $L_{XY}$ is chosen as being, to within a multipartite positive constant, the projection on the XY plane of the direction of the axis of rotation $\vec{a}$ that is determined subsequently:

$$\vec{b}=\pi_{XY}(\vec{a})/\|\pi_{XY}(\vec{a})\|,$$

with $$\pi_{XY} = \begin{bmatrix} 1 & 0 & 0 \\ 0 & 1 & 0 \\ 0 & 0 & 0 \end{bmatrix}$$

the matrix of projection on the XY plane. Thus it is assumed that the direction of rotation of the object O with respect to the direction of the axis of rotation $\vec{a}$ which is determined subsequently, is known (or assumed), for example according to the adjustment of the imaging system 10, once the direction $\vec{b}$ has been chosen (such that $\vec{b}=\pi_{XY}(\vec{a})/\|\pi_{XY}(\vec{a})\|$). Thus the angular rate $\tau$ of rotation is determined:

$$\tau = \begin{cases} |\tau| & \text{for positive rotations} \\ -|\tau| & \text{for negative rotations.} \end{cases}$$

If the direction of rotation of the object is unknown, it is chosen arbitrarily: in this case, the three-dimensional representation V of the object O will at worst be the three-dimensional representation V of the mirror of the object O.

Step 350 of determining the angle $\phi$ on the basis of the symmetrization times $t(s)$ furthermore comprises a step 354 of determining, for each pixel s, a distance $z(s)$ between, on the one hand, the middle $$\frac{s + L_{XY}(s)}{2}$$

of the segment between the pixel s and its symmetric counterpart $L_{XY}(s)$ with respect to the projection $L_{XY}$, and, on the other hand, the center $c(s)$ of the circle about which rotates a point o of the object O passing through the pixel s. This distance is positive if the center $c(s)$ is above the XY plane, it is zero if $c(s)$ is in the XY plane, and negative otherwise.

Preferably, the distance $z(s)$ is given by the relation:

$$z(s) = d(s) \frac{\|S - L_{XY}(s)\|}{2\tan\left(\frac{t(s)\tau}{2}\right)},$$

with $t(s)\tau$ the angle of the arc of the circle from s to the symmetric point $L_{XY}(s)$ in the direction of rotation, $$d(s) = \begin{cases} 1 & \text{if } s \in P^R \\ -1 & \text{if } s \in P^L, \end{cases}$$

$P^R$ and $P^L$ being the two half-planes of the section plane P, separated by the projection $L_{XY}$. $P^R$ and $P^L$ are defined by:

$$P^L = \{s \in P : <\vec{b} \wedge (s-y_0), \vec{e}_3> \geq 0\}$$

$$P^R = \{s \in P : <\vec{b} \wedge (s-y_0), \vec{e}_3> < 0\},$$

with $\wedge$ the vector product, $<.,.>$ the scalar product, and $$\vec{e}_3 = \begin{bmatrix} 0 \\ 0 \\ 1 \end{bmatrix}$$

the direction of the Z axis of the reference frame. $P^R$ and $P^L$ do not depend on the position of $y_0$ on the projection $L_{XY}$.

In theory, there is an affine relation between the distance $z(s)$ and the position on projection $L_{XY}$ of the axis of rotation, of the point $$\frac{s + L_{XY}(s)}{2}$$

(which is also the projection of s on the projection $L_{XY}$ of the axis of rotation) with respect to the point $y_0$:

$$z(s) = <s-y_0, \vec{b}> \cos\phi + z_0,$$

with $z_0 \geq 0$ if the projection of the point $y_0$ on the axis of rotation L is above the XY plane or in the XY plane and $z_0 < 0$ otherwise, and $|z_0|$ is the distance between $y_0$ and the axis of rotation L.

Thus, preferably, step 350 of determining the angle $\theta$ on the basis of the symmetrization times t(s) furthermore comprises a step 356 of determining the angle $\theta$ through the regression of the previous affine relation:

$$(\hat{\phi}, \hat{z}_0) = \underset{\phi, z_0}{\operatorname{argmin}} \sum_{s \in G_{\delta, \sigma_{min}}} \left( z(s) - \langle s - \hat{y}_0, \vec{b} \rangle \cos\hat{\phi} - \hat{z}_0 \right)^2,$$

with $G_{\delta, \sigma_{min}}$ the set of pixels s of the grid G whose distance with respect to the projection $L_{XY}$ of the axis of rotation exceeds a certain threshold $\delta$ and such that the empirical variance of the gray levels taken by the pixel s in the sequence of sectional images $X_0, \ldots, X_m$ exceeds a certain threshold $\sigma_{min}^2$.

In practice, $\delta$ is chosen between 4 and 20 pixels, $\sigma_{min}^2$ is for example the q-quantile of the empirical variances of the gray levels, calculated for each pixel s of the grid G, taken by the pixel s in the sequence of sectional images $X_0, \ldots, X_m$ (thereby signifying that the proportion of the pixels s of the grid G, where the calculated empirical variance of the gray levels is less than or equal to $\sigma_{min}^2$, is substantially equal to q), q equals between 60% and 95% in general.

Limiting the previous regression to the pixels in $G_{\delta, \sigma_{min}}$ makes it possible to improve the robustness of the estimation by using only the symmetrization times for the pixels in $G_{\delta, \sigma_{min}}$ which are in general more reliable.

Step 334 of determining the direction $\vec{a}$ furthermore comprises a step 358 of determining the direction $\vec{a}$, on the basis of the projection $L_{XY}$ and of the angle $\phi$. The direction $\vec{a}$ of the axis of rotation L is for example given by the vector of spherical coordinates $(1, \theta, \phi)$, with $\theta$ the angle between the X axis and the direction $\vec{b}$ of the projection $L_{XY}$, such that $\vec{b} = \pi_{XY}(\vec{a})/\|\pi_{XY}(\vec{a})\|$.

Optional Determination of the Point of Passage of the Axis of Rotation

As an optional supplement, step 300 of determining the axis of rotation L and the series of perturbation translations $T_1 \ldots T_m$ furthermore comprises a step 360 of determining a point of passage $u_0$ of the axis of rotation L, on the basis of the symmetrization time or times t(s). Preferably, the point of passage $u_0$ chosen as being the point of intersection between the axis of rotation L and the straight line perpendicular to the XY plane and passing through the point $y_0$. The point of passage $u_0$ is in this case given by the following relation:

$$u_0 = y_0 + \frac{z_0}{\sin\phi}\vec{e}_3.$$

Determination of the Series of Perturbation Translations

Step 300 of determining the axis of rotation L and the series of perturbation translations $T_1 \ldots T_m$ furthermore comprises a step 362 of determining the series of perturbation translations $T_1 \ldots T_m$, carried out in the same manner as in step 330.

More precisely, step 362 of determining the series of perturbation translations $T_1 \ldots T_m$ comprises a step 364 of determining, in the same manner as in step 324, the reference translation vectors $v_{k,k'}$ of the affine transformations $F_{k,k'}$ whose values minimize the cost function U, with the direction $\vec{a}$ of the axis of rotation L and the angular rate $\tau$ both known.

By virtue of the knowledge of the direction $\vec{a}$ of the axis of rotation, the minimization of U is greatly simplified, by independently minimizing each term $\chi \text{Aff}(Q_{k,k'}(\vec{a}, \tau), v_{k,k'}, X_k)$, $X_{k'}$) so as to individually determine each reference translation vector $v_{k,k'}$.

Step 362 of determining the series of perturbation translations $T_1 \ldots T_m$ furthermore comprises a step 366 of determining the series of perturbation translations $T_1 \ldots T_m$ and the point of passage $u_0$ having the values which minimize the cost function K of step 332, knowing the reference translation vectors $v_{k,k'}$.

As a variant, when the optional step 360 is carried out, the minimization of the cost function K is simplified by using the point of passage $u_0$ determined in this step. Moreover, step 366 amounts to determining the series of perturbation translations $T_1 \ldots T_m$ having the value which minimizes the cost function K, the point of passage $u_0$ being known.

Determination of a Three-Dimensional Representation of the Object

With reference to FIG. 10, step 400 of determining the three-dimensional representation V of the object O comprises a step 402 of determining a volume D, included in the volume U of the chamber 20, on which the object O will be "reconstructed". The volume D comprises the object O (at least in part) and its close environment. For example, the volume D is a parallelepiped.

Step 400 of determining the three-dimensional representation V of the object O furthermore comprises a step 404 of determining a set $\Omega$ of points u of the volume D and a value X(u) of each of these points u at a reference instant. Hereinafter, the initial instant $t_0$ will be chosen as reference instant. The set $\Omega$ of points u comprises, in particular, points o of the object O in its position $O_0$ at the initial instant $t_0$.

It will be noted that, in a very simple implementation, the set $\Omega$ of points u already forms a three-dimensional representation of the object, said representation being given by the constellation of the points of the set $\Omega$.

Step 404 of determining the set of points $\Omega$ is carried out on the basis of the positions of the object O with respect to the section plane P at each picture capture instant $t_0 \ldots t_m$, and of the sequence of sectional images $X_0 \ldots X_m$.

More precisely, step 404 of determining the set of points Ω comprises a step 406 of calculating, for each sectional image $X_k$, the position $C_k(s)$ of each pixel s of the sectional image $X_k$ at the initial instant $t_0$, assuming that this pixel belongs to the object O. The calculation is carried out on the basis of the previously determined parameters of the motion of the object O (angular rate τ, axis of rotation L, series of perturbation translations $T_1 \ldots T_m$). The position $C_k(s)$ of each point u of the set Ω is given for a respective original pixel s of an image $X_k$, by:

$$C_k(s) = R_{\vec{a},\tau(t_k-t_0)}^t (\pi_3 s - u_0 - \overline{T}_k) + u_0$$

with $\overline{T}_k = R_{\vec{a},\tau(t_k-t_1)} T_1 + R_{\vec{a},\tau(t_k-t_2)} T_2 + \ldots + R_{\vec{a},\tau(t_k-t_{k-1})} T_{k-1} + T_k$, with $\overline{T}_0 = 0$, $R_{\vec{a},\tau(t_k-t_0)}^t$ is the matrix transpose of $R_{\vec{a},\tau(t_k-t_0)}$. The set Ω consists of the points u of the volume D with position $C_k(s)$ for each pixel s and each sectional image $X_k$. Thus s and $X_k$ are said to be respectively the original pixel and the image of the point u. It is noted that $C_k(s)$ is also the position in the reference frame of the object O chosen for the pixel s of the section plane at the instant of capture $t_k$ of the sectional image $X_k$.

Each of the points u of the set Ω is associated with the value $X_k(s)$ of the original pixel s of the original sectional image $X_k$: $X(u) = X_k(S)$.

It will be noted that the set Ω can thus comprise one and the same point u several times, each time associated with a respective value, these various values stemming from various sectional images.

Step 400 of determining the three-dimensional representation V of the object O furthermore comprises a step 408 of choosing a three-dimensional representation function $V_\beta$ that can be parametrized with parameters β, and an operation Op giving, on the basis of the three-dimensional representation function $V_\beta$, an estimation function $\tilde{X} = Op(V_\beta)$ of the value of each point u of the set Ω.

Once the parameters β have been determined, the three-dimensional representation V is given by the three-dimensional representation function $V_\beta$, preferably at any point of the volume D.

First Variant of Three-Dimensional Representation Function $V_\beta$

With reference to FIG. 11, in a first variant, the three-dimensional representation function $V_\beta$, chosen in the course of step 408, is a decomposition into B-spline functions of degree r with nodes w spaced apart in an equal manner in space:

$$w = b + (a_1 k_1, a_2 k_2, a_3 k_3),$$

with b∈$R^3$, and $a_1$, $a_2$ and $a_3$ respectively the sampling increment in the directions X, Y and Z, and $k_1$, $k_2$, $k_3$ integers. Each parameter of the three-dimensional representation function $V_\beta$ is associated with a respective node.

The three-dimensional representation function $V_\beta$ may then be written:

$$\forall u = (u_1, u_2, u_3) \in D,$$

$$V(u) = \sum_{w=(w_1,w_2,w_3) \in W} \eta\left(\frac{u_1 - w_1}{a_1}\right) \eta\left(\frac{u_2 - w_2}{a_2}\right) \eta\left(\frac{u_3 - w_3}{a_3}\right) \beta(w),$$

with η the central B-spline function of degree r defined on the set of real numbers R, W the set of nodes in the volume D. η is for example the indicator function on the interval $\left[-\frac{1}{2}, \frac{1}{2}\right]$, convolved r times with itself:

$$\eta(x) = \underbrace{1_{\left[-\frac{1}{2},\frac{1}{2}\right]} * 1_{\left[-\frac{1}{2},\frac{1}{2}\right]} * \ldots * 1_{\left[-\frac{1}{2},\frac{1}{2}\right]}}_{r+1 \text{ times}}(x).$$

In particular, if r=3 (cubic B-spline function):

$$\eta(x) = \begin{cases} \frac{2}{3} - x^2 + \frac{|x|^3}{2}, & \text{if } 0 \le |x| < 1 \\ \frac{(2-|x|)^3}{6}, & \text{if } 1 \le |x| < 2 \\ 0, & \text{if } |x| \ge 2. \end{cases}$$

In this first variant, the operation Op is chosen as the identity function, so that the estimation function $\tilde{X}$ for the value of each point u of the set Ω is equal to the three-dimensional representation function $V_\beta$: $\tilde{X}(u) = V_\beta(u)$.

With this choice of three-dimensional representation function $V_\beta$, step 400 of determining the three-dimensional representation V of the object O furthermore comprises a step 410 of dividing the volume D into a plurality of mutually disjoint sub-volumes $D_i$. As a variant, the edges of the sub-volumes $D_i$ overlap. In this way, the nodes w are also divided into groups {w}, each associated with a respective sub-volume $D_i$. Likewise, the points of the set Ω are divided into groups $Ω_i$ each associated with a respective sub-volume $D_i$.

More precisely, each group {w}, comprises the nodes situated in the respective sub-volume $D_i$ and the parameters {β}$_i$ of these nodes {w}, are thus associated with the sub-volume $D_i$. Likewise, the points of each group $Ω_i$, are the points of the set Ω situated in the sub-volume $D_i$.

Step 400 of determining the three-dimensional representation V of the object O furthermore comprises a step 412 of determining the parameters β, such that, for each point u of the set Ω, the estimation $\tilde{X}(u)$ of the value of the point u gives substantially the value X(u) of the point u.

More precisely, step 412 of determining the parameters β comprises, for each sub-volume $D_i$, a step 414 of determining the parameters {β}$_i$ associated with this sub-volume $D_i$, such that, for each point u of the group $Ω_i$ and of the groups directly contiguous with the group $Ω_i$, the estimation $\tilde{X}(u)$ of the value of the point u gives substantially the value X(u) of the point u, the parameters {β}$_{j \ne i}$ associated with the other subsets $D_{j \ne i}$ being fixed at a given value.

Step 414 of determining the parameters {β}$_i$ is implemented several times, in an iterative manner, each time sweeping all the sub-volumes $D_i$: in the course of the first iteration, each group of parameters {β}$_i$ is determined successively (for the determination of a group of parameters {β}$_i$, the given value of each of the other groups of parameters {β}$_{j \ne i}$ is fixed at a predetermined value, for example zero); in the course of the subsequent iterations, each group of parameters {β}$_i$ is determined successively (for the determination of a group of parameters {β}$_i$, the given value of each of the other groups of parameters {β}$_{j \ne i}$ is the last result determined beforehand).

Preferably, the parameters $\{\beta\}_i$ are determined by minimizing the following cost function:

$$U(\beta) = \sum_{u \in \Omega} (\tilde{X}(u) - X(u))^2 + \lambda \beta^t A \beta,$$

A is a positive definite symmetric matrix, or more generally semi-positive definite, $\beta^t A \beta$ is a measure of the quadratic irregularity, and $\lambda > 0$ is a compromise between the fitness of the three-dimensional representation function and regularity.

Second Variant of Three-Dimensional Representation Function $V_\beta$

With reference to FIG. 12, the three-dimensional representation function $V_\beta$, chosen in the course of step 408, may be written in the form of a decomposition into Radial Basis Functions (RBF) $\phi$ with the nodes w:

$$\forall u \in D, \quad V_\beta(u) = \sum_{w \in W} \phi(u - w)\beta(w),$$

with W the set of nodes in the volume D.

The function $\phi(u-w)$ depends on the distance between the point u and the node w, but not on the direction between the point u and the node iv. For example, $\phi(x) = \exp(-c\|x\|^2)$ or $\phi(x) = \eta(\|x\|)$ with $\eta$ the cubic central B-spline function.

Furthermore, the operation Op gives an estimation function $\tilde{X} = \text{Op}(V_\beta, f_R)$ for the value of each point u of the set $\Omega$ on the basis of the three-dimensional representation function $V_\beta$ and a point spread function $f_R$. In the example described, the operation Op is a convolution of the three-dimensional representation function $V_\beta$ with the following point spread function $f_R$: $f_R(u) = f(Ru)$, with $f$ the point spread function without rotation, which is known (for example, given by the constructor of the imaging system, or determined experimentally), $f_R$ the point spread function for the rotation R, and Ru the point resulting from the rotation of the point u by the rotation R.

The point spread function $f_R$ depends on the rotation R between the position of the object O at the instant $t_k$ of capture of the respective sectional image $X_k$ associated with the point u, and the position of the object O at the reference instant $t_0$: $R = R_{\vec{a}, \pi(t_k - t_0)}$. Thus, for each point u of the set $\Omega$, $$\tilde{X}(u) = \text{Op}(V_\beta, f_R)(u) = (V_\beta * f_R)(C_k(s)),$$

with * the convolution operation, the pixel s and the sectional image $X_k$ (of the instant of capture $t_k$) being respectively the original pixel and the image of the point u.

On account of the choice of radial basis functions $\phi$, we obtain the property that, for each point u of the volume D:

$$\text{Op}(\phi, f_R)(u) = \text{Op}(\phi, f)(Ru),$$

i.e.:

$$(\phi * f_R)(u) = (\phi * f)(Ru)$$

with * the convolution operation, R an arbitrary rotation.

Thus, step 400 of determining the three-dimensional representation V of the object O furthermore comprises a step 416 of determining the parameters $\beta$ of the three-dimensional representation function $V_\beta$ by minimizing the following cost function:

$$E(\beta) = \sum_{u \in \Omega} \left( X(u) - \sum_{w \in W} (\phi * f)(\pi_3 s - \zeta_i - R_i w)\beta(w) \right)^2 + \lambda \beta^t A \beta,$$

where s and the sectional image $X_i$ the instant of capture $t_i$) are respectively the original pixel and the image of the point u, $R_i = R_{\vec{a}, \pi(t_i - t_0)}$ and $\zeta_i = T_i + u_0 - R_{\vec{a}, \pi(t_i - t_0)} u_0$.

In an advantageous manner, this minimization is carried out by calculating a unique convolution (the convolution $\phi * f$) and by solving the linear system, which ensues from the calculation of the convolution $\phi * f$, on the parameters $\beta$. The parameters $\beta$ are thus easily determined.

Variant for Determining the Set $\Omega$

FIG. 13 illustrates a variant embodiment of step 404 of determining a set $\Omega$ of points u of the volume D and a value $X(u)$ of each of these points u at a reference instant, so as to determine the set of points $\Omega$ on the basis of several sequences of sectional images, denoted $S_l$ with $l = 1 \ldots I$. Each sequence $S_l$ is composed of the sectional images $X_0^l, X_1^l, \ldots, X_{m_l}^l$, at respective instants of picture captures $t_0^l, t_1^l, \ldots, t_{m_l}^l$.

In this variant, step 404 of determining the set of points $\Omega$ comprises a step 420 of determining a three-dimensional representation function $V_l$, on a respective sub-volume $D_l$, for each sequence $S_l$. This step 420 is for example implemented according to the previous steps 408 to 416 for each sequence $S_l$.

Each three-dimensional representation function $V_l$ gives a representation of the object O in a respective position, denoted $O_l$.

Step 404 of determining the set of points $\Omega$ furthermore comprises a step 422 of discretizing each sub-volume $D_l$ according to a three-dimensional grid $G_3$. A discretized sub-volume $\tilde{D}_l$, grouping together the points of the sub-volume $D_l$ that are situated on the three-dimensional grid $G_3$, is thus obtained for each sequence $S_l$. We thus obtain:

$$\forall u \in \tilde{D}_l, \tilde{V}_l(u) = V_l(u).$$

Preferably, the three-dimensional grid $G_3$ has a spacing which is less than or equal to that of the grid G of the section plane P.

Step 404 of determining the set of points $\Omega$ furthermore comprises a step 424 of determining, for each sequence $S_l$, a rotation $Q_1$ and a translation $h_l$ making it possible to substantially place all the positions $O_l$ of the representations of the object O in one and the same reference position.

Preferably, the reference position is that of one of the sequences $S_l$. Hereinafter, the position $O_l$ of the object of the first sequence $S_l$ will be the reference position. Thus, a point o of the object O of the position u in $O_l$ is at the position $Q_l u + h_l$ in $O_l$, with $l \neq 1$.

Step 424 of determining, for each sequence $S_l$, a rotation $Q_l$ and a translation $h_l$ comprises a step 426 of determining a quantile level q, such that substantially the luminous points of the object O have values $\tilde{V}_l(u)$ that are greater than or equal to the q-quantile $\rho_l(q)$, for each discretized subset $\tilde{D}_l$. For example, the quantile level q is taken between 60% and 95%.

Step 424 of determining, for each sequence $S_l$, a rotation $Q_l$ and a translation $h_l$ furthermore comprises a step 428 of selecting at least three groups $g_1 \ldots g_k$, preferably four or more, of points of the discretized subset $\tilde{D}_l$, according to a selection criterion. The selection criterion is the same for all the sequences $S_l$. The selection criterion applies in particular to the value of the points of the discretized subset $\tilde{D}_l$.

By thus applying the same selection criterion for all the sequences $S_l$, it is possible to obtain substantially the same points of the object O for all the sequences $S_l$, even if these points do not have the same position for the various sequences $S_l$.

In a first variant represented in FIG. 13, step 428 of selecting the groups $g_1 \ldots g_k$, comprises a step 430 of selecting one and the same number n of the most luminous points (having the highest values). Preferably, the number n is the integer closest to $\min(qn_1, \ldots, qn_l)$ (q is expressed as a percentage), with $n_1, \ldots, n_l$ the numbers of points in the discretized subsets $\tilde{D}_1 \ldots \tilde{D}_l$.

Step 428 of selecting the groups $g_1 \ldots g_k$ furthermore comprises a step 432 of ranking, for each sequence $S_l$, the n most luminous points (selected previously) according to their value, in descending order for example.

Step 428 of selecting the groups $g_1 \ldots g_k$ furthermore comprises a step 434 of dividing the n ranked most luminous points into k groups $g_1 \ldots g_k$ of substantially equal size: the points of the group $g_1$ are more luminous than those of the group $g_2$, which are more luminous than those of $g_3$, etc.

In a second variant represented in FIG. 14, step 428 of selecting the groups $g_1 \ldots g_k$, comprises a step 436 of calculating, for each sequence $S_l$, the barycenter $b_l$ of the points u of the subset $\tilde{D}_l$, whose values are greater than the q-quantile $\rho_l(q)$. The set of these points will subsequently be denoted $\tilde{D}_{l,q}$. For the calculation of the barycenter $b_l$, all the points have the same weighting.

Step 428 of selecting the groups $g_1 \ldots g_k$, furthermore comprises a step 437 of determining the highest distance between the barycenter and the points of all the sets $\tilde{D}_{l,q}$. This distance will subsequently be called the radius r.

Preferably, the radius r is given by:

$$r = \min(\max\{\|u-b_1\| : u \in \tilde{D}_{l,q}\}, \ldots, \max\{\|u-b_l\| : u \in \tilde{D}_{l,q}\})$$

Step 428 of selecting the groups $g_1 \ldots g_k$, furthermore comprises a step 438 of dividing the radius r (that is to say of the segment [0,r]) into k segments of equal sizes ($\text{seg}_i = [(k-i)r/k, (k-i+1)r/k]$, with $1 \leq i \leq k$), each group $g_1 \ldots g_k$ being associated with a respective segment.

More precisely, for each sequence $S_l$, each group $g_i$ comprises the points u of $\tilde{D}_{l,q}$ whose distance from the barycenter $b_l$ lies in the associated segment $\text{seg}_i$.

Returning to FIG. 13, step 424 of determining, for each sequence $S_l$, a rotation $Q_l$ and a translation $h_l$ furthermore comprises a step 440 of determining, for each sequence $S_l$, the barycenter $\omega_{l,i}$ of the points u of each of the groups $g_i$. For the calculation of the barycenters $\omega_{l,i}$, the points have identical weightings.

Step 424 of determining, for each sequence $S_l$, a rotation $Q_l$ and a translation $h_l$ furthermore comprises a step 442 of determining the rotation $Q_l$ and the translation $h_l$ on the basis of the barycenters $\omega_{l,i}$.

Preferably, the rotations $Q_l$ and the translations $h_l$ are determined through the minimization of a cost function:

$$(Q_l, h_l) = \arg \min_{Q \in O(3), h \in R^3} \sum_{i=1}^{k} \|Q\omega_{1,i} + h - \omega_{l,i}\|^2,$$

with O(3) the set of 3-by-3 orthogonal matrices.

Preferably, the solution of the previous minimization is obtained by calculating:

$$\begin{cases} Q_l = P_l P_1^t \\ h_l = \overline{\omega}_l - Q_l \overline{\omega}_1 \end{cases} \text{ with } \overline{\omega}_1 = \frac{1}{k} \sum_{i=1}^{k} \omega_{1,i} \text{ and } \overline{\omega}_l = \frac{1}{k} \sum_{i=1}^{k} \omega_{l,i},$$

and $P_1$ and $P_l$ obtained by singular value decomposition (SVD) of the matrix $$M = \sum_{i=1}^{k} (\omega_{1,i} - \overline{\omega}_1)(\omega_{l,i} - \overline{\omega}_l)^t,$$

that is to say $M = P_1 \Lambda P_l^t$ with $P_1$ and $P_l$ 3-by-3 orthogonal matrices, and $\Lambda$ a diagonal matrix with non-negative numbers on the diagonal.

Step 404 of determining the set of points $\Omega$ furthermore comprises a step 444 of determining the points u of $\Omega$ and a value $X(u)$ of each of these points u, on the basis of the sequences of sectional images $S_l$ with $l=1 \ldots I$, the rotation matrices $Q_l$ and the translations $h_l$ being known: the set $\Omega$ consists of the points u of the volume D with position $$Q_l^t R_{\vec{a}_l, \tau_l (t_k^l - t_0^l)} (\pi_3 s - u_0^l - \overline{T}_k^l) + Q_l^t (u_0^l - h_l),$$

for each pixel s of each sectional image $X_k^l$ of each sequence $S_l$, with $\tau_l$, $\vec{a}_l$, $u_0^l$ and $T_k^l$ which are respectively the parameters of the motion for the sequence $S_l$, $Q_1 = I_3$ the 3-by-3 identity matrix, $h_1 = 0$, $\overline{T}_k^l = R_{\vec{a}_l, \tau_l (t_k^t - t_1^t)} T_1^l + R_{\vec{a}_l, \tau_l (t_k^t - t_2^t)} T_2^l + \ldots + R_{\vec{a}_l, \tau_l (t_k^t - t_{k-1}^t)} T_{k-1}^l + T_k^l$ and $\overline{T}_0^l = 0$. Thus s, $X_k^l$ and $S_l$ are said to be respectively the original pixel, the image and the sequence of the point u.

Each of the points u of the set $\Omega$ is associated with the value $X_k^l(s)$ of the pixel s of the sectional image $X_k^l$ of the sequence $S_l$: $X(u) = X_k^l(s)$ with s, $X_k^l$ and $S_l$ being respectively the original pixel, the image and the sequence of the point u.

Taking Account of the Duration of Acquisition

In the course of the capture of the sectional images, the object O moves during the time of exposure to create an image on the focal plane. This engenders a non-negligible additional motion fuzziness (supplementing the fuzziness defined by the point spread function).

This motion fuzziness is, in one embodiment of the invention, taken into account in step 400 of the three-dimensional representation V of the object O, preferably when the exposure time is relatively long with respect to the time necessary to pass from one sectional image $X_k$ to the next sectional image $X_{k+1}$.

Thus, with reference to FIG. 15, in a third variant, step 400 of determining the three-dimensional representation V of the object O comprises a step 450 of determining an acquisition interval $I_k = [t_k + \delta_0; t_k + \delta_0 + \delta]$ for each sectional image $X_k$, defined by a start-of-acquisition instant $t_k + \delta_0$ and an end-of-acquisition instant $t_k + \delta_0 + \delta$, the difference giving the duration of acquisition $\delta$. It is assumed that, for $0 \leq k < m$: $t_k \leq t_k + \delta_0 < t_k + \delta_0 + \delta \leq t_{k+1}$.

In the example described, the start-of-acquisition instant $\delta_0$ and the duration of acquisition $\delta$ are the same for all the sectional images. Nonetheless, the procedure easily extends to the case where the start-of-acquisition instant $\delta_0$ and the duration of acquisition $\delta$ vary according to the sectional images.

During exposure, the luminosity level of each point of the focal plane evolves progressively by adding the luminosity level of the points of the route that it travels.

The position of the object O at each instant $t_k$ being known (or estimated), step 400 of the three-dimensional representation V of the object O furthermore comprises a step 452 of determining the continuous position of the object O, as a function of time, between the successive instants $t_k$ and $t_{k+1}$, and more particularly during the acquisition intervals $I_k$.

Thus, step 452 of determining the continuous position of the object O comprises a step 454 of determining a relation between the position $\psi_{k,t}(u)$ at the instant $t_k+t$ (between the successive instants $t_k$ and $t_{k+1}$) of a point of the object, which is situated at the position u at the instant $t_k$, and the object's motion parameters: angular rate $\tau$, axis of rotation L and series of perturbation translations $T_1 \ldots T_m$.

Given that the duration between the instants $t_k$ and $t_{k+1}$ is short, we consider that the motion is composed approximately of the stable rotation and of a translation, a linear fraction (proportional to time) of the perturbation translation between the instants $t_k$ and $t_{k+1}$.

Thus, the position $\psi_{k,t}(u)$ is given by:

$$\psi_{k,t}(u) = R_{\vec{a},\tau t}(u - u_0) + u_0 + \frac{t}{t_{k+1} - t_k} T_{k+1}, \text{ for } 0 \leq t \leq t_{k+1} - t_k,$$

with $T_{m+1}=0$.

It will be noted that $\psi_{k,0}(u)=u$ and $\psi_{k,t_{k+1}-t_k}(u)$ is the position of the point of the object at the instant $t_{k+}$, starting from the position u at the instant $t_k$.

Step 452 of determining the continuous position of the object O furthermore comprises a step 456 of determining a relation between the position $C_{k,t}(s)$ at the initial instant $t_0$ of the point o of the object, whose position at the instant $t_k+t$ is on the pixel s of the section plane P, on the basis of the previous function $\psi_{k,j}$. This position $C_{k,t}(s)$ is given by:

$$C_{k,t}(s) = R^t_{\vec{a},\tau(t_k-t_0+t)}\left(\pi_3 s - u_0 - \frac{t}{t_{k+1} - t_k} T_{k+1} - R_{\vec{a},\tau t} \overline{T}_k\right) + u_0.$$

Step 400 of determining the three-dimensional representation V of the object O furthermore comprises a step 460 of choosing the operator Op as being the integral over the acquisition interval $I_k$ of the convolution of the three-dimensional representation function $V_\beta$ with the point spread function $f_R$.

Step 400 of determining the three-dimensional representation V of the object O furthermore comprises a step 462 of calculating, for each point u of the set $\Omega$, an estimation $\tilde{X}(u)$ of the value of this point u, on the basis of the operator Op. The estimation $\tilde{X}(u)$ is given by:

$$\tilde{X}(u) = \int_{t=\delta_0}^{\delta_0+\delta} V_\beta * f_{R_{\vec{a},\tau(t_k-t_0+t)}}(C_{k,t}(s))dt,$$

where s and the sectional image $X_k$ (of the instant of capture $t_k$) are respectively the original pixel and the image of the point u.

Just as for the second variant, step 400 of determining the three-dimensional representation V of the object O furthermore comprises a step 464 of choosing the three-dimensional representation function $V_\beta$ as a decomposition into radial basis functions $\phi$:

$$\forall u \in D, \quad V_\beta(u) = \sum_{w \in W} \phi(u-w)\beta(w),$$

with W the set of nodes in the volume D.

Step 400 of determining the three-dimensional representation V of the object O furthermore comprises a step 466 of determining the coefficients $\beta(w)$.

More precisely, by replacing $V_\beta$ by its decomposition into radial basis functions, we obtain, for each point u of the set $\Omega$:

$$\tilde{X}(u) = \sum_{w \in W} \int_{t=\delta_0}^{\delta_0+\delta} \gamma\left(\pi_3 s + R_{\vec{a},\tau(t_k-t_0+t)}(u_0 - w) - \frac{t}{t_{k+1} - t_k} T_{k+1} - R_{\vec{a},\tau t} \overline{T}_k - u_0\right) dt \beta(w),$$

where s and the sectional image $X_k$ (of the instant of capture $t_k$) are respectively the original pixel and the image of the point u, and $\gamma = \phi * f$.

We write $$\gamma_{k,w}(x) = \int_{t=\delta_0}^{\delta_0+\delta} \gamma\left(x + R_{\vec{a},\tau(t_k-t_0+t)}(u_0 - w) - \frac{t}{t_{k+1} - t_k} T_{k+1} - R_{\vec{a},\tau t} \overline{T}_k - u_0\right) dt.$$

We therefore have, for each point u of the set $\Omega$:

$$\tilde{X}(u) = \sum_{w \in W} \gamma_{k,w}(\pi_3 s) \beta(w),$$

where s and the sectional image $X_k$ (of the instant of capture $t_k$) are respectively the original pixel and the image of the point u.

Just as for the second variant $y=\phi*f$ is preferably calculated analytically or numerically by approximate calculations.

Thus, step 466 of determining the coefficients $\beta(w)$ comprises a step of calculating the values $\gamma_{k,w}$.

If the analytical calculation of $\gamma_{k,w}$ is unwieldy or impossible, $\gamma_{k,w}$ is approximated by a discrete sum, for example the Riemann sum:

$$\gamma_{k,w}(x) \approx \frac{\delta}{J} \sum_{j=0}^{J-1} \gamma\left(x + R_{\vec{a},\tau(t_k-t_0+\delta_0+\delta\frac{j}{J})}(u_0 - w) - \frac{\delta_0 + \delta\frac{j}{J}}{t_{k+1} - t_k} T_{k+1} - R_{\vec{a},\tau(\delta_0+\delta\frac{j}{J})} \overline{T}_k - u_0\right),$$

with J a fairly large integer, for example $J \approx 20$.

More generally, in the case where several sequences $S_l$, $l=1, \ldots, I$ are used, the rotations $Q_l$ and the translations $h_l$ being known, step 466 of determining the coefficients $\beta(w)$ comprises a step consisting in substantially placing all the positions $O_l$ of the representations of the object O in one and the same reference position. Recall that by choosing for example the first sequence as the reference sequence, $Q_1=I_3$ (with $I_3$ the 3-by-3 identity matrix) and $h_1=0$, it is possible to decompose, in the reference frame of the reference sequence, for each point u of the set $\Omega$, the estimation $\tilde{X}(u)$ of the value of this point u into a linear combination associated with the coefficients $\beta(w)$:

$$\tilde{X}(u) = \sum_{w \in W} \gamma_{k,w}^l (\pi_3 s) \beta(w),$$

with $$\gamma_{k,w}^l(x) =$$

$$\int_{t=\delta_0}^{\delta_0+\delta} \gamma \left( R_{\vec{a}_l, \tau_l(t_k^l - t_0^l + t)} Q_l^t R_{\vec{a}_l, \tau_l(t_k^l - t_0^l + t)}^t \left( x - u_0^l - \frac{t}{t_{k+1}^l - t_k^l} T_{k+1}^l - R_{\vec{a}_l, \tau_l} T_k^l \right) + R_{\vec{a}_l, \tau_l(t_k^l - t_0^l + t)} (Q_l^t(u_0^l - h_l) - w) \right) dt$$

where s, the sectional image $X_k^l$ (of the instant of capture $t_k^l$) and $S_l$ are respectively the original pixel, the image and the sequence of the point u, $\tau_l$, $\vec{a}_l$, $u_0^l$ and $T_k^l$ are the parameters of the motion for the sequence $S_l$, $T_{m_l+1}^l=0$ and $\gamma=\phi*f$.

Thus, in this case, step 466 comprises a step of calculating the values $\gamma_{k,w}^l$.

Like $\gamma_{k,w}(x)$, $\gamma_{k,w}^l(x)$ can also be approximated by a discrete sum (Riemann sum for example).

Preferably, D is chosen sufficiently large such that D contains all the points u with position $$Q_l^t R_{\vec{a}_l, \tau_l(t_k^l - t_0^l)}(\pi_3 s - u_0^l - \overline{T}_k^l) + Q_l^t(u_0^l - h_l),$$

for each pixel s of each sectional image $X_k^l$ of each sequence $S_l$, with l=1 ... I. The parameters $\beta$ of the three-dimensional representation function $V_\beta$ are determined by minimizing the following quadratic cost function:

$$E(\beta) = \sum_{l=1}^{I} \sum_{k=1}^{m_l} \sum_s \left( X_k^l(s) - \sum_{w \in W} \gamma_{k,w}^l(\pi_3 s)\beta(w) \right)^2 + \gamma \beta^t A\beta,$$

where A is a semi-positive definite matrix, $\beta' A\beta$ measures the irregularity of the coefficients $\beta(w)$, for example A is chosen in the same manner as previously, $\lambda > 0$ is the parameter of compromise between the fitness of the three-dimensional representation function and the regularity of the coefficients. $E(\beta)$ may be written in the following matrix form:

$$E(\beta) = \|y - K\beta\|^2 + \lambda \beta^t A\beta,$$

where $\beta$ is the vector of coefficients, the elements of the vector y are the values $X_k^l(s)$, and the matrix K is composed of the elements $\gamma_{k,w}^l(\pi_3 s)$.

The result of minimizing $E(\beta)$ is the solution of the following linear system:

$$(K^t K + \lambda A)\beta = K^t y.$$

To calculate the coefficients $\beta(w)$, it is possible to use numerical optimization procedures, for example the conjugate gradient procedure, or the block-wise optimization procedure presented previously.

Adjustment of the Position of the Section Plane

It is desirable that the largest part of the object O passes within the section plane P. In an optimal configuration, the axis of rotation L is substantially contained in the section plane P. Thus, in one embodiment of the invention, the method comprises a step 53, inserted between steps 52 and 54, of adjusting the position of the section plane P with respect to the axis of rotation L. Quite obviously, the adjustment step can also be implemented independently of steps 50, 52, 54 and 56.

Provision is made for three ways of carrying out the adjustment step 53, so as to obtain substantially the optimal configuration, or else, by default, an appropriate configuration.

First Adjustment Variant

In a first variant, the adjustment step 53 comprises the displacement and the tilting of the optical microscope so as to place the axis of rotation L in the focal plane P. This variant makes it possible to obtain the optimal configuration.

This variant comprises the determination of the axis of rotation L in the same manner as in steps 54 and 56.

Second Adjustment Variant

In a second variant, the adjustment step 53 comprises the modification of the electric or electromagnetic field so as to place the axis of rotation L in the focal plane P. This variant also makes it possible to obtain the optimal configuration.

This variant comprises the determination of the axis of rotation L in the same manner as in steps 54 and 56.

Third Adjustment Variant

With reference to FIG. 16, in a third variant, the adjustment step 53 comprises the displacement of the focal plane P in the direction Z (the direction perpendicular to the focal plane P) so that the focal plane P cuts the object O substantially in the middle of the object. The displacement of the focal plane P is obtained by translating the optical microscope 12, and/or by acting on the lens 14 to change the focal distance.

In the example described, the middle of the object O is taken as being the barycenter of the object O.

Thus, with reference to FIG. 16, the adjustment step 53 comprises first of all a step 53A of capturing a sequence of sectional images $X_0 \ldots X_m$, and then a step 53B of determining the angular rate $\tau$, the axis of rotation L and the series of perturbation translations $T_1 \ldots T_m$. Step 53B is implemented in the same manner as step 56.

The adjustment step 53 furthermore comprises a step 53C of determining the set of points $\Omega$ in the same manner as in step 404.

The adjustment step 53 furthermore comprises a step 53D of determining a barycenter b of the luminous points of the set $\Omega$. The barycenter b is preferably determined by the relation:

$$b = \frac{\sum_{i=0}^{n} \sum_s 1_{X_i(s) > a} C_k(s)}{\sum_{i=0}^{n} \sum_s 1_{X_i(s) > a}},$$

with $X_0 \ldots X_n$, $n \le m$ the part of the sectional images $X_0 \ldots X_m$, which have been acquired during the time interval in the course of which the object carries out a maximum number of complete revolutions by revolving about the axis of rotation, $1_{B>A}=1$ when B is greater than A and 0 otherwise, and $\alpha$ is for example the q-quantile of gray level of the sectional images $X_0 \ldots X_n$ (thereby signifying that the proportion of the pixels which have a gray level less than or equal to $\alpha$ is substantially equal to q). Generally, q equals between 60% and 95%.

The adjustment step 53 furthermore comprises a step 53E of calculating the projection $\bar{b}$ of the barycenter b onto the axis of rotation L.

The adjustment step 53 furthermore comprises a step 53F of adjusting the imaging system 10 so as to bring the section plane P onto the projection $\bar{b}$ of the barycenter b.

Annex

Let $\phi$ be a radial basis function. For any rotation matrix R, $\phi(Rx)=\phi(x)$. We then have:

$$\phi * f_R(x) = \int \phi(x-u)f(Ru)du$$
$$= \int \phi(x-R^t y)f(y)dy$$
$$= \int \phi(Rx-y)f(y)dy$$
$$= \phi * f(Rx).$$

The invention claimed is:

1. A method for determining a three-dimensional representation (V) of an object (O), characterized in that it comprises:
   the determination (404) of a set ($\Omega$) of points (u) of a volume (D) and of a value (X(u)) of each of these points (u) at a given instant ($t_0$), the set ($\Omega$) of points (u) comprising points (o) of the object (O) in its position at the given instant ($t_0$),
   the choosing (408) of a three-dimensional representation function ($V_\beta$) that can be parametrized with parameters ($\beta$), and of an operation (Op) giving, on the basis of the three-dimensional representation function ($V_\beta$), an estimation function (X~=Op($V_\beta$)) for the value of each point (u) of the set ($\Omega$),
   the determination of parameters ($\beta$), such that, for each point (u) of the set ($\Omega$), the estimation (X~(u)) of the value of the point (u) gives substantially the value of the point (X(u)),
   the determination (450) of an interval acquisition ($I_k=[t_k+\delta_0; t'_k+\delta_0+\delta]$) of each sectional image ($X_k$),
   the determination of a continuous motion of the object during the interval of acquisition of each sectional image,
   the taking into account of the continuous motion of the object during the acquisition interval so as to determine the three-dimensional representation of the object, further characterized in that:
   the motion of the object (O) with respect to the section plane (P) comprises a motion of rotation about a fixed axis and with a fixed angular rate and a series of perturbation translations, each undergone by the object between two successive respective sectional images,
   the continuous motion comprises the rotation about the fixed axis and with the fixed angular rate during the acquisition time for each sectional image, and a linear fraction of the perturbation translation undergone by the object between the sectional image and the next one.

2. The method as claimed in claim 1, furthermore characterized in that the three-dimensional representation function ($V_\beta$) comprises a decomposition into basis functions ($\Phi$) around nodes (w) so as to obtain a sum of terms, each term comprising the basis function ($\Phi$) with a variable (u-w) dependent on a respective node (w) associated with this term.

3. The method as claimed in claim 2, furthermore characterized in that the basis function ($\Phi$) comprises a product of B-spline functions (ii) in each of the three directions (X, Y and Z) in space.

4. The method as claimed in claim 1, furthermore characterized in that:
   the volume (D) comprises a plurality of sub-volumes ($D_i$),
   the parameters ($\beta$) being distributed in groups of parameters ($\{\beta\}_i$), the three-dimensional representation function ($V_\beta$) is chosen so that each group of parameters ($\{\beta\}_i$) is associated with a respective sub-volume ($D_i$),
   the determination of the parameters ($\beta$) comprises, successively for each sub-volume ($D_i$), the determination of the parameters ($\{\beta\}_i$) associated with this sub-volume ($D_i$), such that, for each point (u) of the sub-volume ($D_i$), and preferably also of the sub-volumes directly contiguous with the sub-volume ($D_i$), the estimation (X~(u)) of the value of the point (u) gives substantially the value (X(u)) of the point (u), the parameters $\{\beta\}_{j \neq i}$ associated with the other sub-volumes ($D_{j \neq i}$) being fixed at a given value.

5. The method as claimed in claim 2, furthermore characterized in that:
   the value (X(u)) of each point (u) of the set ($\Omega$) is obtained on the basis of a respective sectional image ($X_k$) of the object, associated with the point (u),
   the operation (Op) gives a function ((X~=Op($V_\beta$, $f_R$)) for estimating the value of each point (u) of the set ($\Omega$), on the basis of the three-dimensional representation function ($V_\beta$) and of a point spread function ($f_R$), the point spread function ($f_R$) depending on a rotation (R) between the position of the object (O) at the instant ($t_k$) of capture of the respective sectional image ($X_k$) associated with the point (u), and the position of the object (O) at the given instant ($t_0$),
   the three-dimensional representation function ($V_\beta$) is chosen such that, for each point u of volume (D): Op($\Phi$, $f_R$)(u)=Op ($\Phi$,f)(Ru), with Op the operation, $\Phi$ the basis function, R an arbitrary rotation, $f_R$ the point spread function for the rotation R, $f_R(u)=f(Ru)$, f the point spread function without rotation, and Ru the point resulting from the rotation of the point u by the rotation R.

6. The method as claimed in claim 5, furthermore characterized in that the operation (Op) is a convolution of the three-dimensional representation function ($V_\beta$) with the point spread function ($f_R$).

7. The method as claimed in claim 6, furthermore characterized in that the basis function ($\Phi$) is a radial basis function, each term depending on the distance of each point (u) with the node (w) associated with this term, but being independent of the direction between the point (u) and the node (w).

8. The method as claimed in claim 1, furthermore characterized in that the determination (404) of the set ($\Omega$) of points (u) and of a value (X(u)) of each point (u) is carried out on the basis of several sequences ($S_l$) of sectional images, and in that it comprises:
   the determination (420) of a three-dimensional representation function ($V_l$) that can be parametrized with parameters ($\beta$), on a respective sub-volume ($D_l$), for each sequence ($S_l$), each three-dimensional representation giving a representation of the object in a respective position,
   the determination (424), for each sequence ($S_l$), of a rotation ($Q_l$) and of a translation ($h_l$) making it possible to substantially place all the positions ($O_1$) of the representations of the object (O) in a reference position.

9. The method as claimed in claim 8, furthermore characterized in that the determination (424), for each sequence ($S_l$), of the rotation ($Q_l$) and of the translation ($h_1$) comprises:
   the selection (428), in each subset ($D_l$), of at least three groups ($g_l \ldots g_k$), preferably four or more, of points of the subset ($D_l$), according to a selection criterion, which is the same for all the sequences ($S_l$) of sectional images, the determination of the rotation ($Q_l$) and of the translation ($h_l$) of each sequence ($S_l$) of sectional images on the basis of the groups of points ($g_l \ldots g_k$).

10. The method as claimed in claim 9, characterized in that the determination of the rotation ($Q_l$) and of the translation ($h_l$) of each sequence ($S_l$) of sectional images on the basis of the groups of points ($g_l \ldots g_k$) comprises: the calculation (436), for each sequence ($S_l$) of sectional images, of a barycenter of each of the groups of points ($g_l \ldots g_k$), the determination (442) of the rotation ($Q_l$) and of the translation ($h_l$) of each sequence ($S_l$) on the basis of the barycenters.

11. A computer program stored on non-transitory computer-readable media and characterized in that it comprises computer-executable instructions to implement the method as claimed in claim 1.

12. An imaging system characterized in that it comprises: means (12) making it possible to obtain images in a focal plane P, a receptacle (18) for receiving an object (O), means (34, 30) for setting the object (O) into motion, means (36) for receiving sectional images captured in the focal plane, which means are adapted for implementing a method as claimed in claim 1.

\* \* \* \* \*